(12) United States Patent
Cheng et al.

(10) Patent No.: US 12,228,976 B2
(45) Date of Patent: Feb. 18, 2025

(54) KEYBOARD APPARATUS AND TERMINAL

(71) Applicant: HUAWEI TECHNOLOGIES CO., LTD., Guangdong (CN)

(72) Inventors: Haiyu Cheng, Shenzhen (CN); Jianqiang Xu, Dongguan (CN); Fan Wang, Shenzhen (CN); Yuyin Wang, Shenzhen (CN); Jianwei Zeng, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 18/259,486

(22) PCT Filed: Dec. 15, 2021

(86) PCT No.: PCT/CN2021/138249
§ 371 (c)(1),
(2) Date: Jun. 27, 2023

(87) PCT Pub. No.: WO2022/143167
PCT Pub. Date: Jul. 7, 2022

(65) Prior Publication Data
US 2024/0061477 A1    Feb. 22, 2024

(30) Foreign Application Priority Data

Dec. 28, 2020 (CN) .......................... 202011581651.6

(51) Int. Cl.
*G06F 1/16* (2006.01)
(52) U.S. Cl.
CPC .......... *G06F 1/1669* (2013.01); *G06F 1/1626* (2013.01)

(58) Field of Classification Search
CPC .... G06F 1/1632; G06F 1/1616; G06F 1/1669; G06F 1/1633; G06F 1/1622; G06F 1/1624; G06F 1/1671
See application file for complete search history.

(56) References Cited

U.S. PATENT DOCUMENTS

| | | | |
|---|---|---|---|
| 10,983,567 B1* | 4/2021 | Files | G06F 1/1673 |
| 2014/0071607 A1* | 3/2014 | Frinak | G06F 1/1624 |
| | | | 361/679.09 |

(Continued)

FOREIGN PATENT DOCUMENTS

| CN | 204009758 U | 12/2014 |
|---|---|---|
| CN | 104914924 A | 9/2015 |
| CN | 204833165 U | 12/2015 |

*Primary Examiner* — Matthew A Eason
*Assistant Examiner* — Sujit Shah
(74) *Attorney, Agent, or Firm* — WOMBLE BOND DICKINSON (US) LLP

(57) ABSTRACT

This application provides a keyboard apparatus. The keyboard module is stacked on the base and is in sliding fit with the base. The first plate is rotatably connected to one end of the base, where a first rotating part is formed between the first plate and the base. The second plate is rotatably connected to one end of the first plate that is away from the base. A second rotating part is formed between the second plate and the first plate. The third plate is rotatably connected to one end of the keyboard module that is close to the first plate, and is fastened to the second plate. The third plate is configured to carry a tablet device, where a third rotating part is formed between the third plate and the keyboard module. At least one of the rotating parts of the keyboard apparatus is provided with a damping structure.

20 Claims, 11 Drawing Sheets

(56) References Cited

U.S. PATENT DOCUMENTS

| | | | |
|---|---|---|---|
| 2015/0282354 A1* | 10/2015 | Spollen | H05K 5/03 |
| | | | 206/45.2 |
| 2018/0210503 A1 | 7/2018 | Fathollahi et al. | |
| 2020/0183462 A1* | 6/2020 | Li | G06F 1/1616 |

* cited by examiner

KEYBOARD APPARATUS AND TERMINAL

CROSS-REFERENCE TO RELATED APPLICATIONS

This application is a national stage of International Application No. PCT/CN2021/138249, filed on Dec. 15, 2021, which claims priority to Chinese Patent Application No. 202011581651.6, filed on Dec. 28, 2020. Both of the aforementioned applications are hereby incorporated by reference in their entireties.

TECHNICAL FIELD

This application relates to the field of electronic device technologies, and in particular, to a keyboard apparatus and a terminal.

BACKGROUND

Currently, a tablet product is used mainly in two scenarios. In one scenario, the tablet product is used alone as an entertainment tool. In the other scenario, the tablet product is used as an office product. To be specific, a tablet device is used in combination with a detachable keyboard apparatus. In the second scenario, the keyboard apparatus generally includes two parts: a shell cover and a keyboard. The shell cover is foldable, has functions of adsorbing and accommodating the tablet, and also provides functions such as angle adjustment and support for the tablet.

To use the keyboard apparatus, the shell cover needs to be flipped and opened first. Then a bottom of the tablet device is supported on the keyboard. The operation is relatively complex for users.

SUMMARY

This application provides a keyboard apparatus and a terminal, to simplify operations of using the keyboard apparatus.

This application provides some embodiments of a keyboard apparatus. The keyboard apparatus includes a base, a keyboard module, a first plate, a second plate, and a third plate. The keyboard module is stacked on the base and is in sliding fit with the base. The first plate is rotatably connected to one end of the base, where a first rotating part is formed between the first plate and the base. The second plate is rotatably connected to one end of the first plate that is away from the base, where a second rotating part is formed between the second plate and the first plate. The third plate is rotatably connected to one end of the keyboard module that is close to the first plate, and is fastened to the second plate, to drive the second plate to rotate. The third plate is configured to carry a tablet device, where a third rotating part is formed between the third plate and the keyboard module. At least one of the rotating parts of the keyboard apparatus is provided with a damping structure. When the third plate is flipped, so that the third plate is inclined relative to the base, the third plate drives the keyboard module to slide along the base. The third plate drives, through the second plate, the first plate to rotate, so that the base, the first plate, and the third plate form a triangular support structure.

The keyboard apparatus includes the base, the keyboard module, the first plate, the second plate and the third plate. The keyboard module is stacked on the base and is in sliding fit with the base. The first plate is rotatably connected to the end of the base, where the first rotating part is formed between the first plate and the base. The second plate is rotatably connected to the end of the first plate that is away from the base, where the second rotating part is formed between the second plate and the first plate. The third plate is rotatably connected to the end of the keyboard module that is close to the first plate, and is fixedly connected to the second plate, to drive the second plate to rotate. The third plate is configured to carry the tablet device, where the third rotating part is formed between the third plate and the keyboard module. The third plate provides a function of connecting the second plate and the keyboard module, to form a connecting rod slider mechanism, so as to realize linkage between the keyboard apparatus and the tablet device. This simplifies operations, makes the terminal device scientific and technological as well as sophisticated, and improves user experience of the terminal device. The at least one of the rotating parts of the keyboard apparatus is provided with the damping structure. The third plate is flipped, so that the third plate is inclined relative to the keyboard module, and the third plate drives the keyboard module to slide along the base. The third plate drives, through the second plate, the first plate to rotate, so that the base, the first plate, and the third plate form the triangular support structure. A resistance to motion is formed through the damping structure. The base, the first plate, and the third plate can form a stable triangular support structure. Therefore, the third plate can maintain a suspending state at any angular position inclined relative to the base. Stable suspension at any angle within a preset angular range is realized, and a stepless angular display effect is obtained. This meets angle change requirements in a scenario with a maximum number of users.

In some embodiments, the keyboard module includes a fastened base and a rotating shaft that are in rotatable fit with each other. The fastened base is disposed at the end of the keyboard module that is close to the first plate. The rotating shaft is fixedly connected to the third plate. A damping structure is provided between the fastened base and the rotating shaft.

The keyboard module of the keyboard apparatus includes the fastened base and the rotating shaft that are in rotatable fit with each other. The fastened base is disposed at one end of the keyboard module. The rotating shaft is fixedly connected to the third plate. This increases stability and connection strength of the third plate during movement, prevents the third plate from shaking to affect stability of the tablet device, and effectively prevents the connection between the third plate and the keyboard module from being damaged. The damping structure is provided between the fastened base and the rotating shaft. The third plate can be stably maintained at any position within a rotation stroke, so that the tablet device can be maintained in an inclined state at any angle.

In some embodiments, a movable portion is provided in a middle portion of the rotating shaft. The movable portion is rotatable about the rotating shaft. The third plate is fixedly connected to the movable portion.

In some embodiments, the base includes a fastened base and a rotating shaft that are in rotatable fit with each other. The fastened base is disposed at one end of the base. The rotating shaft is fastened relative to the first plate. A damping structure is provided between the fastened base and the rotating shaft.

The base of the keyboard apparatus includes the fastened base and the rotating shaft that are in rotatable fit with each other. The fastened base is disposed at one end of the base.

The rotating shaft is fastened relative to the first plate. This increase stability of the first plate during movement and provides more reliable support. The damping structure is provided between the fastened base and the rotating shaft. The first plate 3 can be stably maintained at any position within the rotation stroke, so that the shape of the triangular support structure formed between the base, the first plate, and the third plate is stable and unchanged, and the tablet device can be maintained in the inclined state at any angle.

In some embodiments, the damping structure includes a first damping structure. The first damping structure includes a first cam and a second cam that are pressed against each other. The first cam is fixedly connected to the fastened base. The second cam is fixedly connected to the rotating shaft. A protrusion structure is provided on an end face of the first cam. The end face of the first cam abuts against an end face of the second cam through the protrusion structure, thereby forming a damping.

In some embodiments, the first damping structure further includes a first support shaft, and the first support shaft is connected to one end of the rotating shaft. The second cam is slidably connected to the first support shaft, and the first cam is sleeved on the first support shaft.

The first damping structure of the keyboard apparatus further includes the first support shaft, and the first support shaft is connected to one end of the rotating shaft. The second cam is slidably connected to the first support shaft, and the first cam is sleeved on the first support shaft, so that the first damping structure can be independent of the fastened base and the rotating shaft. Therefore, a module that can be produced separately is formed, thereby facilitating use of the first damping structure.

In some embodiments, the first damping structure further includes a first elastic member, and two ends of the first elastic member elastically abut against the first support shaft and the second cam, respectively, to force the second cam to be pressed against the first cam.

In some embodiments, the first damping structure further includes a first adjusting nut, and the two ends of the first elastic member elastically abut against the first adjusting nut and the second cam respectively. A pre-tightening force of the first elastic member is adjusted through the first adjusting nut, thereby a damping value of the first damping structure is adjusted.

In some embodiments, the first damping structure further includes a first buffer washer, and the first buffer washer is disposed between the first adjusting nut and the first elastic member. The first buffer washer is used to provide buffering and relaxing effects, to ensure that a planar contact is formed between the first adjusting nut and the first elastic member.

In some embodiments, the damping structure includes a second damping structure, and the second damping structure includes a one-way bearing and a friction plate. An outer ring of the one-way bearing is fixedly connected to the fastened base. The friction plate is fixedly connected to the rotating shaft. The friction plate is pressed against an inner ring of the one-way bearing, so that a damping is formed between the friction plate and the inner ring of the one-way bearing. Through the arrangement of the one-way bearing, the second damping structure enables the keyboard apparatus to achieve a characteristic of "easy-opening and hard-closing", to avoid accidents caused by excessively fast closing, and to improve service performance of the terminal device.

In some embodiments, the second damping structure further includes a second support shaft, the second support shaft is connected to one end of the rotating shaft. The friction plate is slidably connected to the second support shaft, and the one-way bearing is sleeved on the second support shaft.

The second damping structure of the keyboard apparatus further includes the second support shaft, the second support shaft is connected to the end of the rotating shaft. The friction plate is slidably connected to the second support shaft, and the one-way bearing is sleeved on the second support shaft, so that the second damping structure can be independent of the fastened base and the rotating shaft. Therefore, a module that can be produced separately is formed, thereby facilitating use of the second damping structure.

In some embodiments, the second damping structure further includes a second elastic member, and two ends of the second elastic member elastically abut against the second support shaft and the friction plate, respectively.

In some embodiments, the second damping structure further includes a connecting piece. A first end of the connecting piece is fixedly connected to the inner ring of the one-way bearing. The friction plate is pressed against a second end of the connecting piece. The connecting piece provides a function of connecting the one-way bearing and the friction plate, generating a damping between the friction plate and the second end of the connecting piece. A cross-section of the first end of the connecting piece is small, to facilitate the connection of the one-way bearing. A cross-section of the second end of the connecting piece is large, to facilitate a large contact area with the friction plate, thereby forming a smooth and reliable connection.

In some embodiments, the second damping structure further includes a friction washer, the friction washer is slidably connected to the second end of the connecting piece. The friction plate is pressed against the friction washer, that is, a damping is generated between the friction plate and the friction washer by using the principle of friction.

In some embodiments, the second damping structure further includes a second adjusting nut. The two ends of the second elastic member elastically abut against the second adjusting nut and the friction plate, respectively. A pre-tightening force of the second elastic member is adjusted through the second adjusting nut, thereby a damping value of the second damping structure is adjusted.

In some embodiments, the second damping structure further includes a second buffer washer. The second buffer washer is disposed between the second adjusting nut and the second elastic member. The second buffer washer is used to provide buffering and relaxing effects, to ensure that a planar contact is formed between the second adjusting nut and the second elastic member.

In some embodiments, a first guide rail and a second guide rail are provided on the base. The first guide rail is disposed in a center of the base. The second guide rail is symmetrically distributed on two sides of the first guide rail. A center of the keyboard module is slidably connected to the first guide rail, and two sides of the keyboard module are slidably connected to the second guide rail, respectively.

The first guide rail and the second guide rail are provided on the base of the keyboard apparatus. The first guide rail is disposed in the center of the base. The second guide rail is symmetrically distributed on two sides of the first guide rail. The center of the keyboard module is slidably connected to the first guide rail, and two sides of the keyboard module are slidably connected to the second guide rail respectively, to enable a stable and smooth sliding between the keyboard apparatus and the base. In addition, the first guide rail serves as a support to a central position of the keyboard module, to prevent the keyboard module from bending due to sinking of the center of the keyboard module. The second guide rail provides a function of connecting the two sides of the keyboard module, to prevent the two sides of the keyboard module from being deformed upward to bend the keyboard module.

In some embodiments, the first guide rail is disposed at one end of the base that is close to the first plate, and extends to a middle portion of the base in a direction away from the first plate. The second guide rail is disposed at one end of the base that is away from the first plate, and extends to the middle portion of the base in a direction toward the first plate. The first guide rail and the second guide rail form a triangular distribution structure, thereby forming a stable planar support structure for the keyboard module. In addition, as the second guide rail is close to a rear end of the base, the second guide rail can be prevented from being exposed in a sliding process of the keyboard module to cause scratching or pinching of a user by the second guide rail.

In some embodiments, a first stop portion is provided on the first guide rail to limit a sliding stroke of the keyboard module, thereby limiting a maximum angle of flipping of the tablet device.

In some embodiments, a second stop portion is provided at one end of the first guide rail that is close to the first plate, to prevent the keyboard module from sliding out of the base in a reverse direction. The second stop portion provides a foolproof function, to prevent the user from opening the keyboard apparatus when the front and back sides of the keyboard apparatus are reversed and prevent the keyboard apparatus from being damaged.

This application provides some embodiments of a terminal, including a tablet device and any one of the foregoing keyboard apparatuses, where the tablet device is fastened to the third plate.

It should be understood that the foregoing general description and the following detailed description are merely examples, and are not intended to limit this application.

REFERENCE NUMERALS

01—keyboard apparatus;
02—tablet device;
1—base;
11—first guide rail;
111—first stop portion;
112—second stop portion;
113—first sliding slot;
114—connecting seat;
12—second guide rail;
121—second sliding slot;
2—keyboard module;
21—keyboard body;
210—touchpad;
22—fastened base;
23—rotating shaft;
231—magnet module;
232—movable portion;
234—cover;
235—Type-C module;
236—Pogopin module;
24—first damping structure;
241—first cam;
242—second cam;
243—first support shaft;
243a—first limit shoulder;
243b—first spline;

244—first elastic member;
245—first adjusting nut;
246—first buffer washer;
25—second damping structure;
251—one-way bearing;
252—friction plate;
253—second support shaft;
253a—second limit shoulder;
253b—second spline;
254—second elastic member;
255—connecting piece;
256—friction washer;
257—second adjusting nut;
258—second buffer washer;
26—third damping structure;
27—first slider;
28—second slider;
29—keyboard reinforcing plate;
3—first plate;
4—second plate;
5—third plate;
51—arc supporting portion;
6—flexible sheet.

The accompanying drawings herein, incorporated into this specification and constituting a part of this specification, show embodiments according to this application, and are used together with the specification to explain principles of this application.

DESCRIPTION OF EMBODIMENTS

To make the objectives, technical solutions, and advantages of this application clearer, the following further describes this application in detail with reference to the accompanying drawings and embodiments. It should be understood that the embodiments described herein are merely used to explain this application, and are not intended to limit this application.

In some embodiments, the following further describes this application in detail through embodiments with reference to the accompanying drawings.

Figure 1:
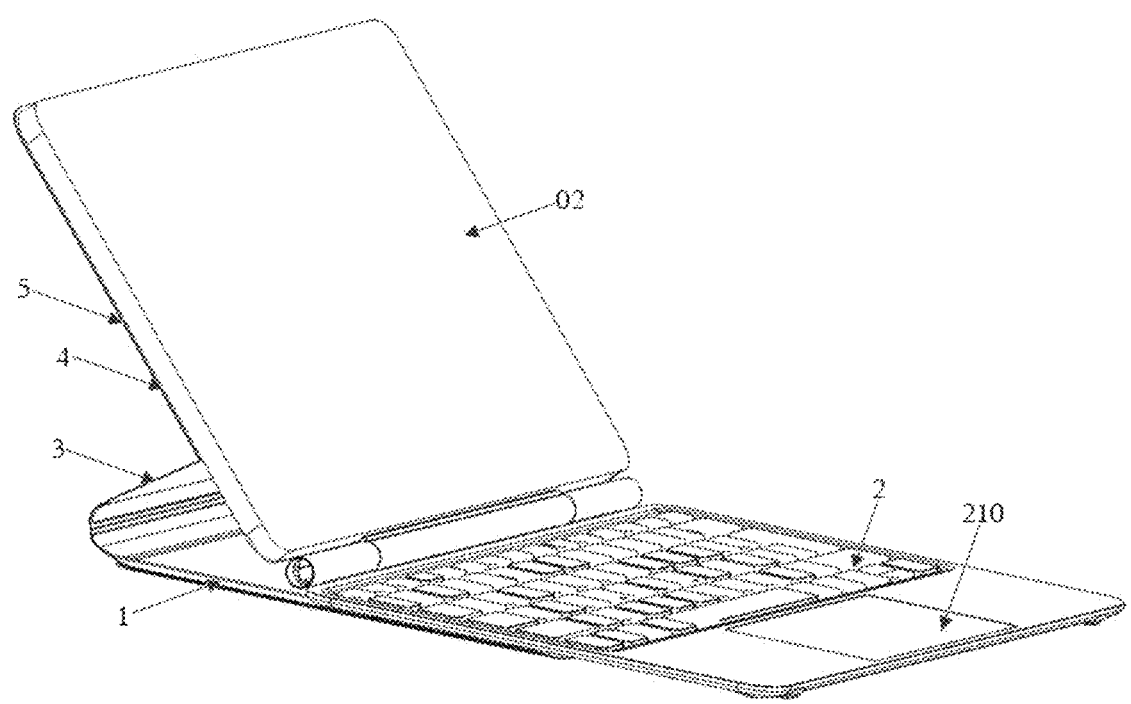
FIG. 1 is a schematic structural diagram of a terminal according to an embodiment of this application.
Figure 2:
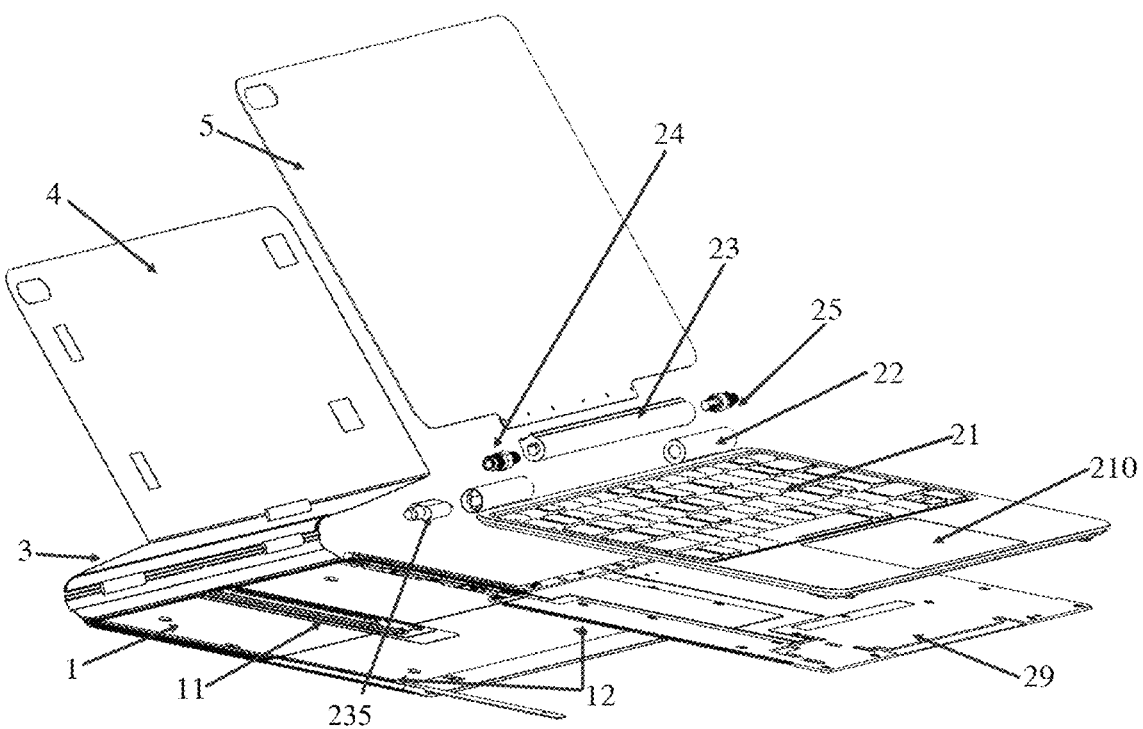
FIG. 2 is a schematic exploded structural diagram of a keyboard apparatus according to an embodiment of this application.

As shown in FIG. 1 and FIG. 2, this embodiment of this application provides a terminal. The terminal includes a keyboard apparatus 01 and a tablet device 02. The tablet device 02 is used in combination with the keyboard apparatus 01 as a terminal device similar to a notebook computer. The terminal device may be used in combination with a keyboard, a stylus, or the like, to implement application of office software such as Word and PS, so as to improve productivity and increase selling points and playability of terminal products. The tablet device 02 is fastened to the keyboard apparatus 01 in a detachable manner. For example, the tablet device 02 may be fastened within the keyboard apparatus 01 in a fastening manner such as a magnet or a clamp. The tablet device 02 can be communicatively connected to the keyboard apparatus 01, so that the tablet device 02 can be controlled through the keyboard apparatus 01. When the keyboard apparatus 01 is closed, the tablet device is accommodated in a space enclosed by the keyboard apparatus 01, and the keyboard apparatus 01 is used to protect the tablet device 02. When the keyboard apparatus 01 is opened (that is, when the keyboard apparatus 01 is in a supported state), the tablet device 02 is carried on the keyboard apparatus 01. The keyboard apparatus 01 is used to support the tablet device 02, so that the tablet device 02 can be maintained in an inclined state, thereby a proper display angle is formed.

In general, the keyboard apparatus 01 includes a base 1, a first plate 3, and a second plate 4. The base 1 forms a main support portion of the keyboard apparatus 01, and the base 1 may carry the keyboard module 2 on it. The first plate 3 is rotatably connected to one end of the base 1, and a first rotating part is formed between the first plate and the base. The second plate 4 is rotatably connected to one end of the first plate 3 that is away from the base 1, and a second rotating part is formed between the second plate and the first plate. The second plate 4 may carry the tablet device 02 on it. When the second plate 4 is flipped in a direction toward the base 1, until both the second plate 4 and the first plate 3 are parallel to a surface of the base 1, the keyboard apparatus 01 is closed, and the tablet device 02 is accommodated in an area enclosed by the second plate 4, the first plate 3, and the base 1. When the second plate 4 is flipped in a direction away from the base 1, the keyboard apparatus 01 is opened. A bottom end of the tablet device 02 is supported on the keyboard module 2. As a result, a triangular support structure is formed between the base 1, the first plate 3, and the tablet device 02, so that the tablet device 02 is maintained in the inclined state. With this structure, when the keyboard apparatus 01 needs to be opened, the use needs to flip the second plate 4 first to lift the tablet device 02, and then support the bottom end of the tablet device 02 on the keyboard module 2. This is complex for the user to operate, and provides a small range of support angles for the tablet device, making it difficult to implement continuous adjustment of the support angle, and affecting user experience of the terminal device.

Therefore, the keyboard apparatus 01 according to this embodiment of this application further includes a third plate 5. The keyboard module 2 is slidably connected to the base 1. The keyboard module 2 can slide along a front-rear direction of the base 1. That is, the keyboard module 2 can slide inward (in a direction away from the user) to form a storage state. On the other hand, the keyboard module 2 can slide outward (in a direction toward the user) to form an in use state. The third plate 5 is rotatably connected to one end of the keyboard module 2 that is close to the first plate 3, and is fastened to the second plate 4, to drive the second plate 4 to rotate. The third plate 5 is configured to carry the tablet device 02, and a third rotating part is formed between the third plate and the keyboard module. The third plate 5 may be disposed on an extension line of the second plate 4, or may be overlaid on a surface of the second plate 4. The third plate 5 may be integrally formed with the second plate 4, or may be connected to the second plate through adhesion or thread connection, and so on, provided that the third plate 5 can be fastened to the second plate 4. The third plate 5 provides a function of connecting the second plate 4 and the keyboard module 2, to form a connecting rod slider mechanism, so as to realize linkage between the keyboard apparatus 01 and the tablet device 02. When the user flips the tablet device 02, the third plate 5 rotates along with the tablet device 02. The third plate 5 drives, through the second plate 4, the first plate 3 to rotate. The bottom end of the third plate 5 drives the keyboard module 2 to slide along the base 1 forward and backward. Therefore, the base 1, the first plate 3, and the third plate 5 form a triangular support structure.

In some embodiments, when the terminal device needs to be used, the third plate 5 is flipped along with the tablet device 02 in a direction away from the base 1. The keyboard module 2 slides outwards as an angle of the third plate 5 changes. When the terminal device is to be closed, the third plate 5 is flipped along with the tablet device 02 in a direction toward the base 1. The keyboard module 2 slides inward as the angle of the third plate 5 changes. That is, when in use, the keyboard apparatus 01 can be switched to a closed state or a supported state simply by flipping of the tablet device 02. This simplifies the operation process, makes the terminal device scientific and technological as well as sophisticated, and improves user experience of the terminal device.

Further, damping structures may be provided at a rotating part of the keyboard apparatus 01. The damping structures may include a first damping structure 24 and a second damping structure 25. The first damping structure 24 and the second damping structure 25 are disposed at two ends of the rotating part. The first damping structure 24 and the second damping structure 25 may be in a same structural form or may be in different structural forms. A resistance to motion is formed through the damping structure. The base 1, the first plate 3, and the third plate 5 can form a stable triangular support structure. Therefore, the third plate 5 can maintain a suspending state at any angle position inclined relative to the base 1. Stable suspension at any angle within a preset angular range (that is, a range of an included angle between the tablet device 02 and the base 1, for example, 90° to 130°) is realized, and a stepless angular display effect is obtained. This meets angle change requirements in a scenario with a maximum number of users.

In addition, in this embodiment of this application, a support position of the bottom end of the tablet device 02 changes as the keyboard module 2 slides forward and backward, so that an inclined angle of the tablet device 02 changes. No adjustment space needs to be reserved on the keyboard module 2. This improves effective utilization of the keyboard module 2, and facilitates arrangement of a functional area of a touchpad 210 on the keyboard module 2. In this embodiment of this application, the touchpad 210 is disposed in an area of the keyboard body 21 that is close to the user.

Further, a bottom of the keyboard module 2 further includes a keyboard reinforcing plate 29, to increase the support strength of the keyboard module 2, prevent the keyboard module 2 from being damaged or deformed, and extend the service life of the keyboard module 2. The keyboard reinforcing plate 29 is fixedly connected to the bottom of the keyboard module 2. In addition, the keyboard reinforcing plate 29 is slidably connected to the base 1, to implement a sliding connection between the keyboard module 2 and the base 1.

Further, a Type-C module 235 may be further disposed on the keyboard apparatus 01. The tablet device 02 may be charged by the Type-C module 235, and does not need to be charged through a charging interface of the tablet device 02. This prevents pulling between a charging cable and the tablet device 02 in a process in which the user carries the terminal device and moves, to cause the tablet device 02 to slip off the keyboard apparatus 01 and affect safety in use.

Figure 3:
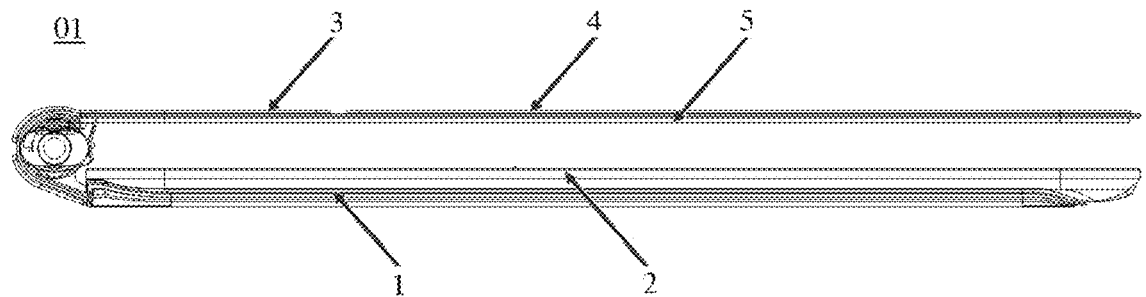
FIG. 3 is a schematic structural diagram of a keyboard apparatus in a closed state according to an embodiment of this application.
Figure 4:
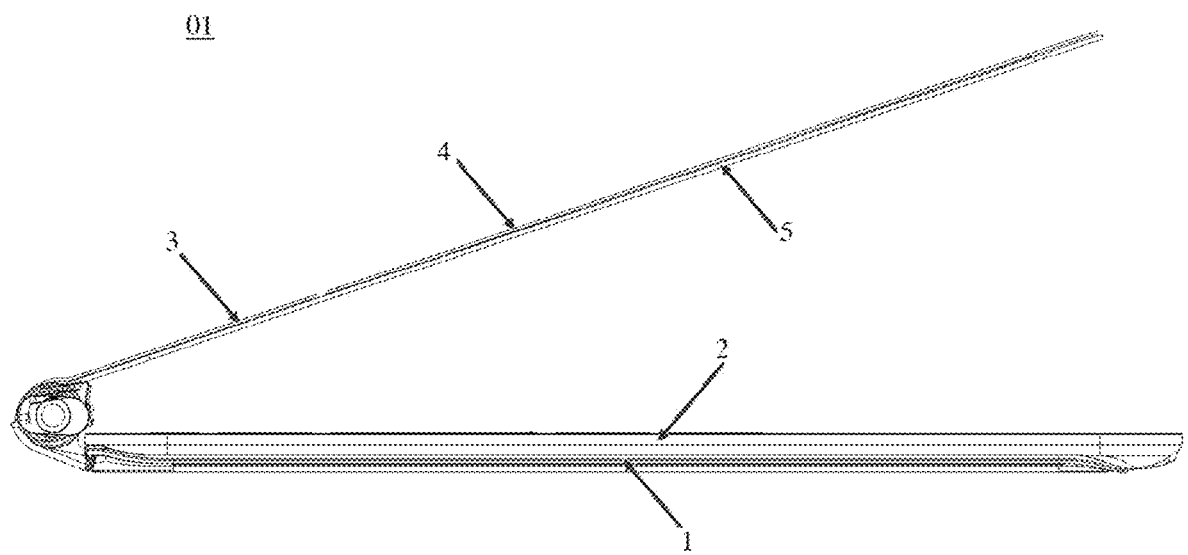
FIG. 4 is a schematic structural diagram of a keyboard apparatus in a process of opening according to an embodiment of this application.
Figure 5:
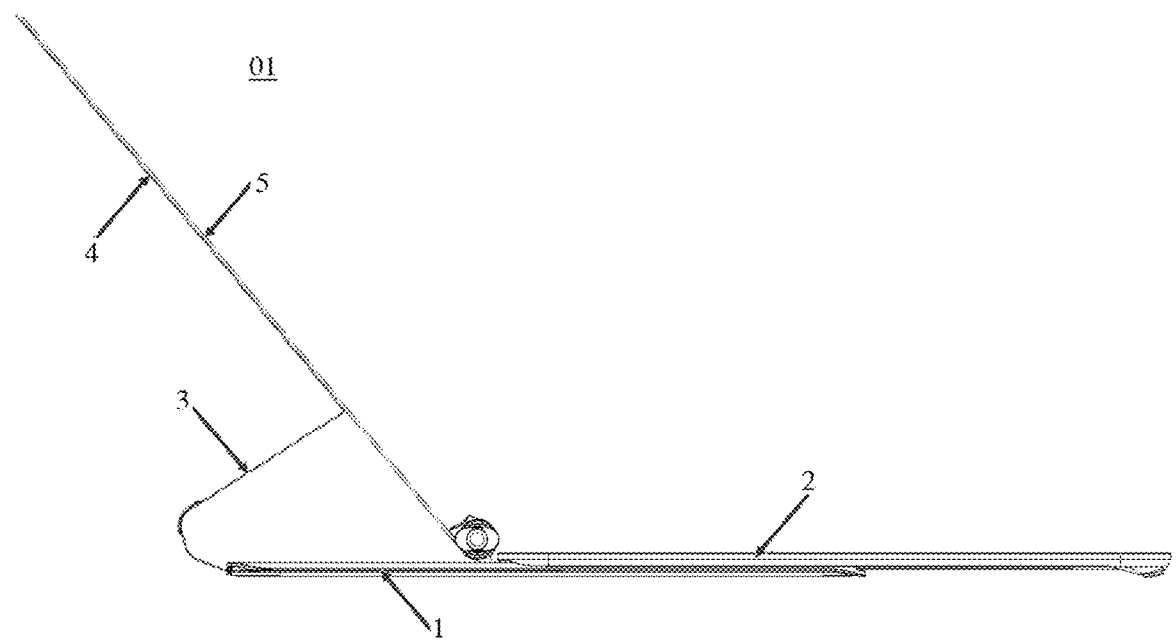
FIG. 5 is a schematic structural diagram of a keyboard apparatus in a supported state according to an embodiment of this application.

In some embodiments, as shown in FIG. 3 to FIG. 5, an operational process of opening a keyboard apparatus according to embodiments of this application may be as follows. When the keyboard apparatus 01 is in the closed state, the third plate 5 is parallel to the base 1. A space for accommodating the tablet device 02 is formed between the third plate 5 and the base 1 (referring to FIG. 3). When the tablet device 02 needs to be used, the user exerts a force on the third plate 5 to rotate the third plate 5 in a direction away from the base 1. An included angle not greater than 90° is formed gradually between the third plate 5 and the base 1. The first plate 3 rotates along with the second plate 4 in the direction away from the base 1. The third plate 5 exerts a force on the keyboard module 2, to make the keyboard module 2 slide outwards (referring to FIG. 4). When the keyboard apparatus 01 is opened, an included angle of 90° to 130° is formed between the third plate 5 and the base 1. The base 1, the first plate 3, and the third plate 5 form a stable triangular support structure (referring to FIG. 5).

Each of the rotating parts of the keyboard apparatus may be connected in a manner such as a veneer, a hinge, or a rotating shaft. A connection by way of a veneer includes a flexible sheet. A relative rotation between two adjacent parts is realized through bending and deformation of the flexible sheet. The structure is simple and the appearance of the apparatus can be improved. A connection by way of a rotating shaft may include a fastened base and a rotating shaft that are in rotatable fit with each other. That is, a shaft hole is provided on the fastened base, and the rotating shaft is installed in the shaft hole and is in rotatable fit with the shaft hole. A stable rotatable fit connection is formed through the connection by way of the rotating shaft. A damping structure is easily provided at the connection by the rotating shaft.

Figure 6:
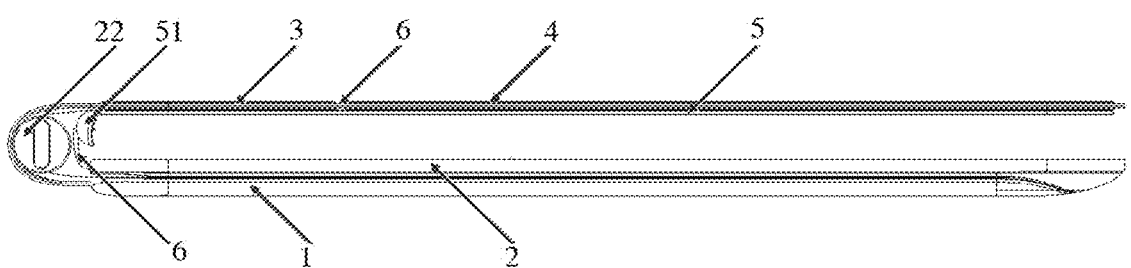
FIG. 6 is a schematic diagram of a connection manner of a keyboard apparatus according to an embodiment of this application.

In some embodiments, referring to FIG. 6, the base 1 is connected to the first plate 3 through a rotating shaft, the first plate 3 is connected to the second plate 4 through a veneer, and a third plate 5 is connected to the keyboard module 2 through a veneer. The base 1 includes a fastened base 22 and a rotating shaft that are in rotatable fit with each other. The fastened base 22 is disposed at one end of the base 1. The rotating shaft is fixedly connected to the first plate 3. This increases stability of the first plate 3 during movement and provides more reliable support. A damping structure is provided between the fastened base 22 and the rotating shaft. The first plate 3 can be stably maintained at any position within the rotation stroke, so that the shape of the triangular support structure formed between the base 1, the first plate 3, and the third plate 5 is stable and unchanged. That is, the tablet device 02 can be maintained in an inclined state at any angle. The first plate 3 and the second plate 4 are connected by a flexible sheet 6, and the third plate 5 and the keyboard module 2 are connected by a flexible sheet 6, to reduce the size of the connection and form a flat appearance.

Further, an arc supporting portion 51 may be provided at a bottom of the third plate 5, and is configured to support the tablet device 02. A Pogopin module may be provided on the arc supporting portion 51. The Pogopin module is electrically connected to the keyboard module 2 and the Type-C module respectively, to implement a communication connection between the tablet device 02 and the keyboard apparatus 01, and implement a function of charging the tablet device 02.

Figure 7:
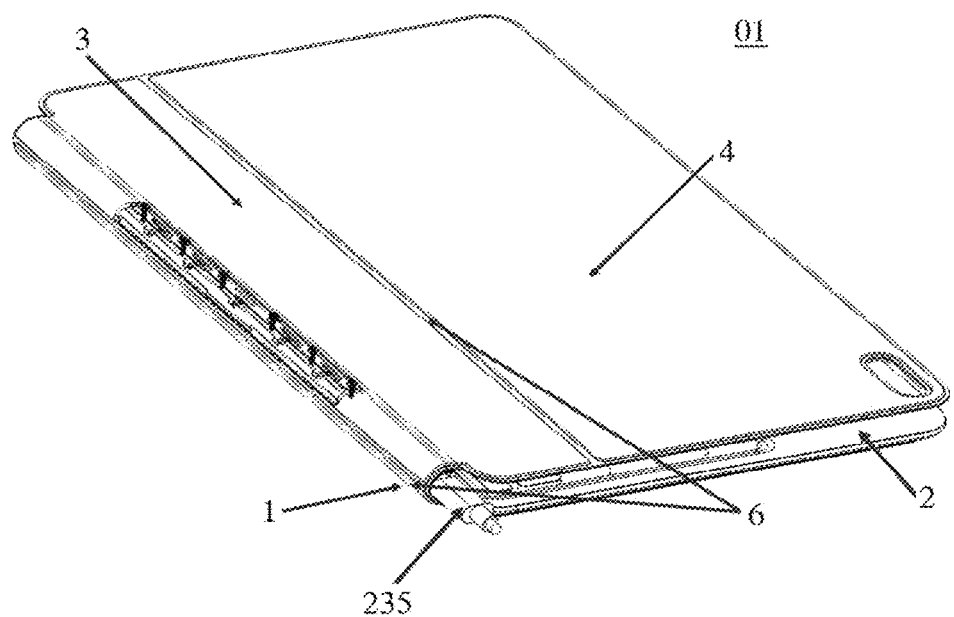
FIG. 7 is a schematic diagram of another connection manner of a keyboard apparatus according to an embodiment of this application.

In some other embodiments, referring to FIG. 7, the keyboard module 2 is connected to the third plate 5 through a rotating shaft, the first plate 3 is connected to the second plate 4 through a veneer, and the first plate 3 is connected to the base 1 through a veneer. The keyboard module 2 includes a fastened base 22 and a rotating shaft 23 that are in rotatable fit with each other. The fastened base 22 is disposed at one end of the keyboard module 2. The rotating shaft 23 is fixedly connected to the third plate 5. This increases stability and connection strength of the third plate 5 during movement, prevents the third plate 5 from shaking to affect stability of the tablet device 02, and effectively prevents the connection between the third plate 5 and the keyboard module 2 from being damaged. A damping structure is provided between the fastened base 22 and the rotating shaft 23. The third plate 5 can be stably maintained at any position within a rotation stroke, so that the tablet device 02 can be maintained in an inclined state at any angle. The first plate 3 and the second plate 4 are connected by a flexible sheet 6, and the first plate 3 and the base 1 are connected by a flexible sheet 6, to form a continuous and flat appearance.

Figure 8:
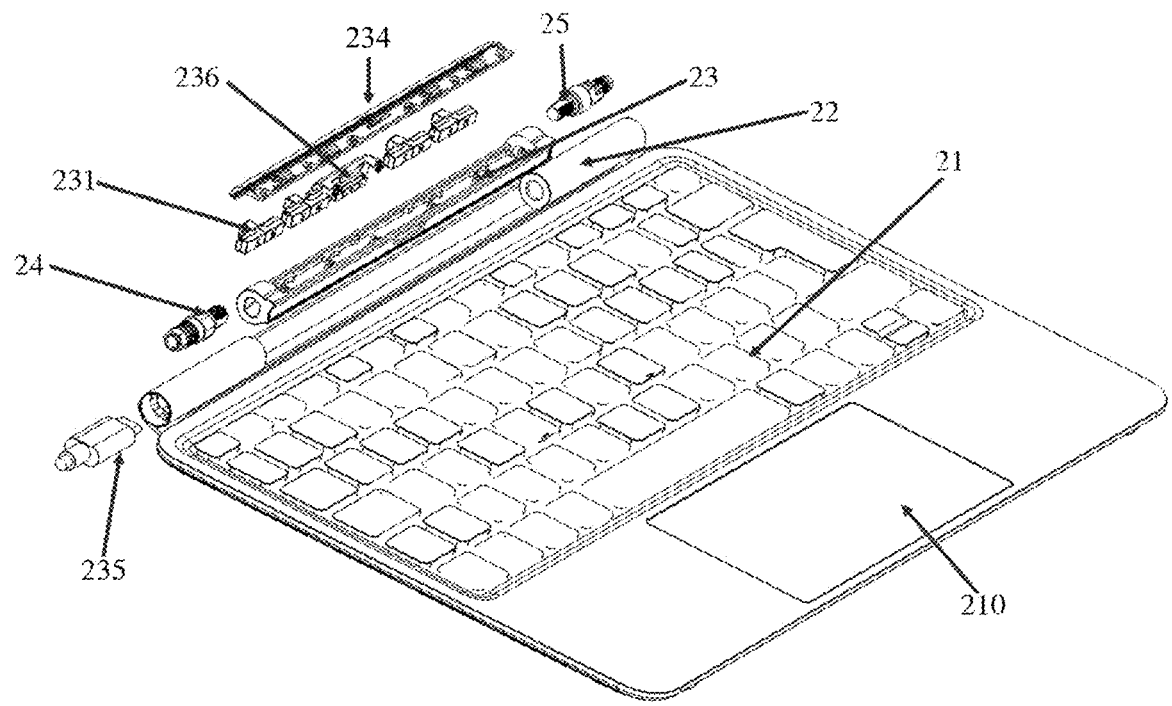
FIG. 8 is a schematic exploded structural diagram of a keyboard module according to an embodiment of this application.
Figure 9:
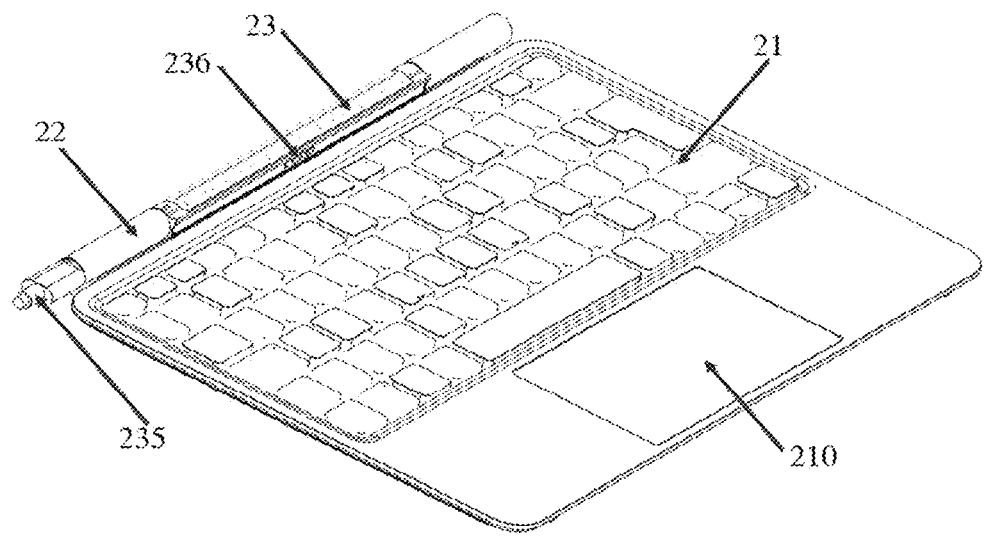
FIG. 9 is a schematic structural diagram of a rotating shaft of the keyboard module shown in FIG. 8 in a closed state.
Figure 10:
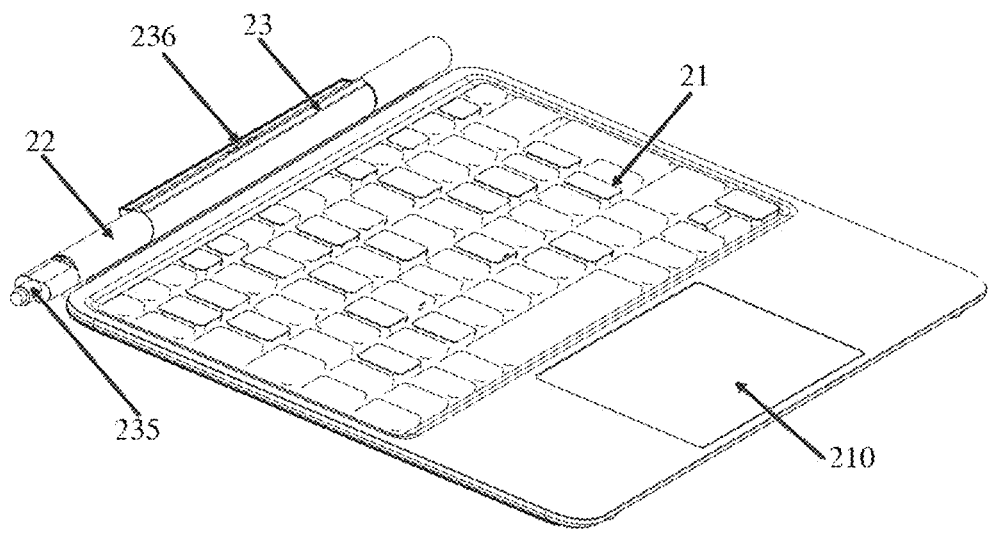
FIG. 10 is a schematic structural diagram of a rotating shaft of the keyboard module shown in FIG. 8 in a supported state.
Figure 11:
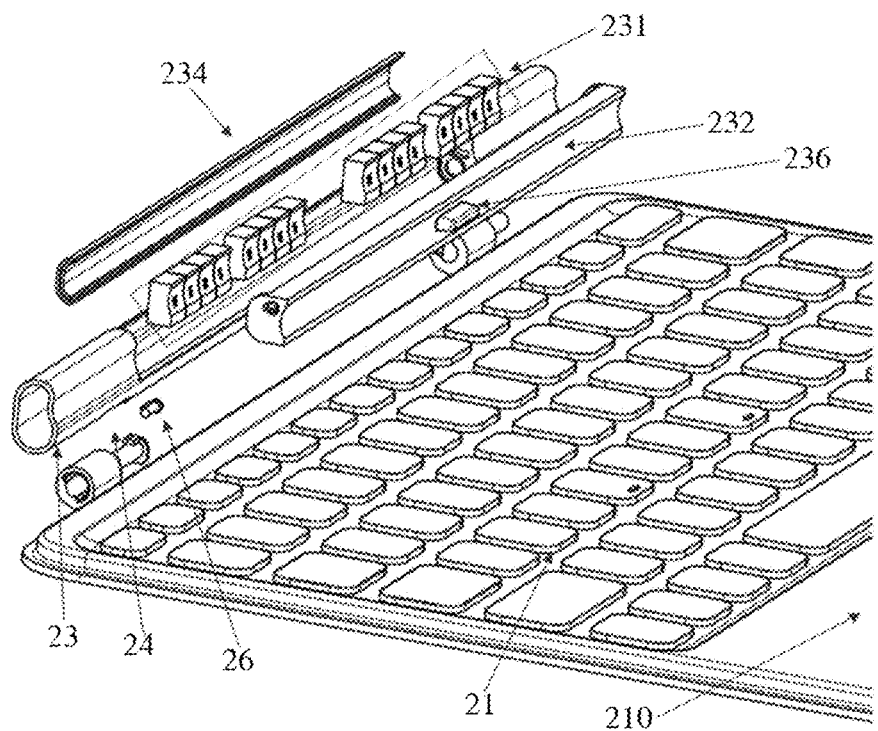
FIG. 11 is a schematic exploded structural diagram of another keyboard module according to an embodiment of this application.
Figure 12:
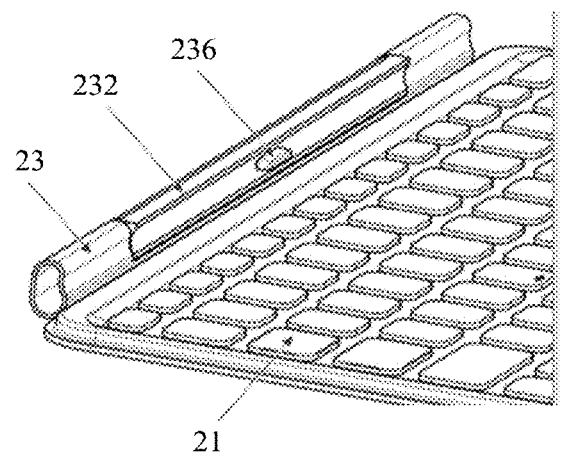
FIG. 12 is a schematic structural diagram of a rotating shaft of the keyboard module shown in FIG. 11 in a closed state.
Figure 13:
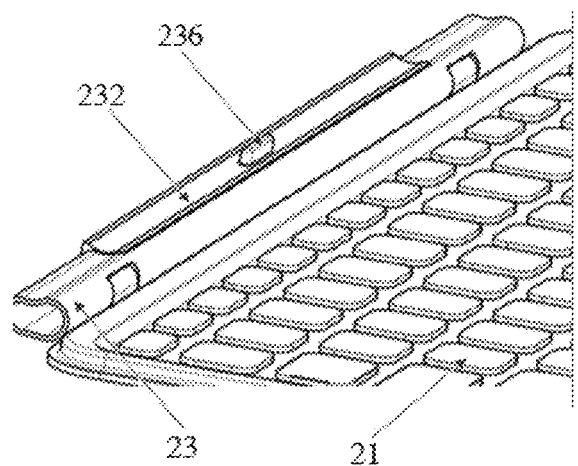
FIG. 13 is a schematic structural diagram of a rotating shaft of the keyboard module shown in FIG. 11 at a support angle of 90°.
Figure 14:
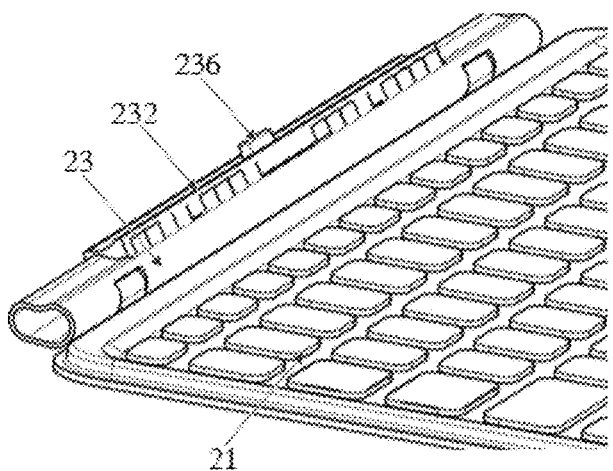
FIG. 14 is a schematic structural diagram of a rotating shaft of the keyboard module shown in FIG. 11 at a maximum support angle.
Figure 15:
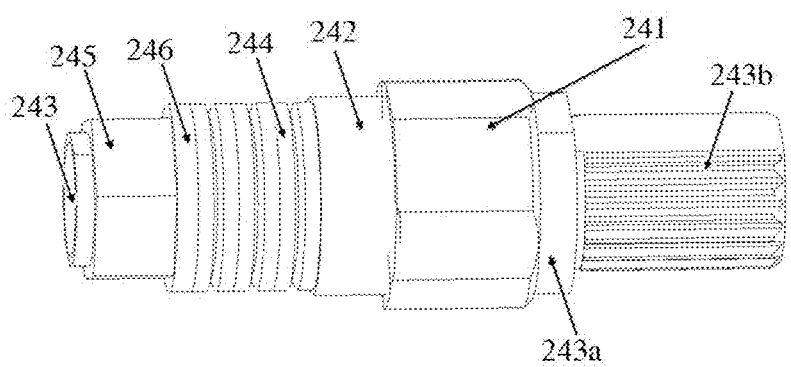
FIG. 15 is a schematic diagram of a first damping structure according to an embodiment of this application.
Figure 16:
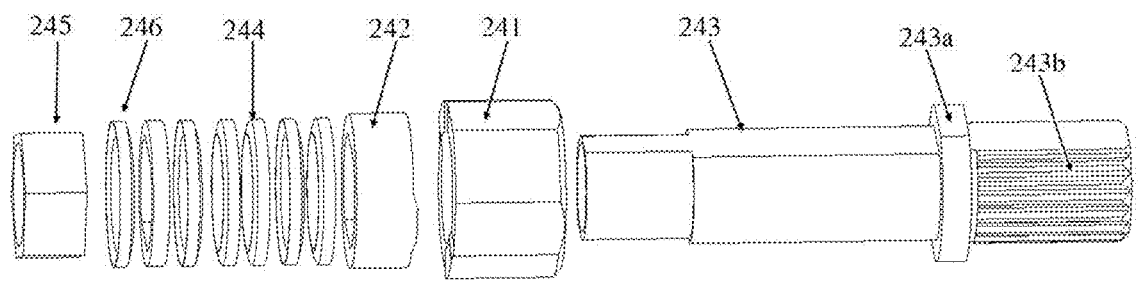
FIG. 16 is a schematic exploded structural diagram of FIG. 15.
Figure 17:
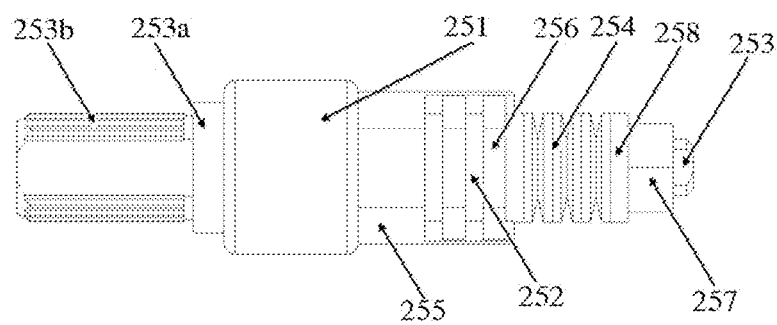
FIG. 17 is a schematic diagram of a second damping structure according to an embodiment of this application.
Figure 18:
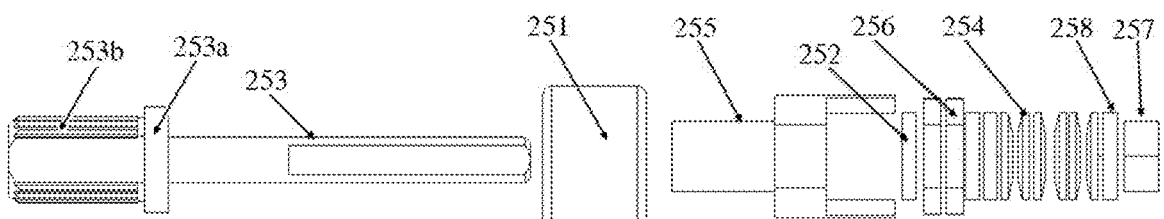
FIG. 18 is a schematic exploded structural diagram of FIG. 17.

As shown in FIG. 8 to FIG. 10, in an embodiment, the rotating shaft 23 is configured as a hollow structure. An opening is provided in a middle portion of the rotating shaft 23. The opening is in communication with an internal cavity of the rotating shaft 23. A cover 234 is installed at the opening. A Pogopin module 236 may be provided in the internal cavity of the rotating shaft 23. The Pogopin module 236 is electrically connected to a keyboard module 2 and a Type-C module 235 respectively, to implement a communication connection between the tablet device 02 and the keyboard apparatus 01, and implement a function of charging the tablet device 02. The Pogopin module 236 may be installed into the rotating shaft 23 from the opening, and is shielded and protected through the cover 234. A probe of the Pogopin module 236 extends out of the rotating shaft 23. When the tablet device 02 is connected to the keyboard apparatus 01, the probe of the Pogopin module 236 fits with a related interface of the tablet device 02, thereby implementing an electrical connection between the tablet device 02 and the keyboard apparatus 01.

In some embodiments, the probe of the Pogopin module 236 protrudes from the rotating shaft 23 on a side on which the tablet device 02 is located. The Pogopin module 236 rotates along with the rotating shaft 23, so that the tablet device 02 can maintain an electrically connected state with the keyboard apparatus 01 when being opened at any angle. When the keyboard apparatus 01 is closed, the probe of the Pogopin module 236 rotates to a position close to the base 1 along with the rotating shaft 23 (referring to FIG. 9). When the keyboard apparatus 01 is opened, the probe of the Pogopin module 236 rotates to a position away from the base 1 along with the rotating shaft 23 (referring to FIG. 10).

Further, a magnet module 231 may be further provided in the rotating shaft 23. The tablet device 02 is connected to the rotating shaft 23 through magnetic adsorption, thereby improving reliability of the electrical connection between the tablet device 02 and the keyboard apparatus 01. Certainly, the tablet device 02 may also be connected to the rotating shaft 23 through a positioning post, a limiting slot, or the like.

As shown in FIG. 11 to FIG. 14, in another embodiment, the rotating shaft 23 is configured as a hollow structure. An opening is provided in a middle portion of the rotating shaft 23. The opening is in communication with an internal cavity of the rotating shaft 23. A cover 234 is installed at and a movable portion 232 is rotatably connected to the opening. The movable portion 232 is rotatable about the rotating shaft 23. The third plate 5 is fixedly connected to the movable portion 232 and moves along with the movable portion 232. The Pogopin module 236 is fixedly connected to the movable portion 232, and is installed into the rotating shaft 23 together with the movable portion 232. A probe of the Pogopin module 236 extends out of the movable portion 232 and is electrically connected to the tablet device 02.

A third damping structure 26 may be provided between the movable portion 232 and the rotating shaft 23. A damping between the movable portion 232 and the rotating shaft 23 is greater than a damping between the movable portion 232 and the fastened base 22. When the third plate 5 is flipped, the movable portion 232 first rotates about the fastened base 22 together with the rotating shaft 23. After the rotating shaft 23 rotates to a maximum angle, the rotating shaft 23 stops rotating, and the movable portion 232 rotates about the rotating shaft 23, to further adjust an angle of the tablet device 02. In some embodiments, when the keyboard apparatus 01 is closed, both the rotating shaft 23 and the movable portion 232 rotate to a position closest to the base 1 (referring to FIG. 12). When the keyboard apparatus 01 needs to be opened, the rotating shaft 23 rotates in a direction away from the base 1. As there is a greater damping between the movable portion 232 and the rotating shaft 23, the movable portion 232 remains static relative to the rotating shaft 23. When the rotating shaft 23 rotates to the maximum angle (which is, for example, 90°, and may be properly designed as required), the rotating shaft 23 stops rotating, and the movable portion 232 starts rotating (referring to FIG. 13). When the movable portion 232 rotates to the maximum angle, the keyboard apparatus 01 is fully opened, and the tablet device 02 achieves a maximum opening angle of 130° (referring to FIG. 14).

As shown in FIG. 8, FIG. 11, FIG. 15, and FIG. 16, the first damping structure 24 according to this embodiment of this application includes a first cam 241 and a second cam 242 that are pressed against each other. The first cam 241 is fixedly connected to the fastened base 22. The second cam 242 is fixedly connected to the rotating shaft 23. A protrusion structure is provided on an end face of the first cam 241. The end face of the first cam abuts against an end face of the second cam 242 through the protrusion structure, thereby forming a damping. Through proper designing of the end face structure of the second cam 242, a predetermined damping value may be implemented, thereby implementing stable suspension at any angle within a predetermined angular range, and implementing a stepless angular display effect.

Further, the first damping structure 24 further includes a first support shaft 243. The first support shaft 243 is fixedly connected to one end of the rotating shaft 23. For example, the first support shaft 243 is connected to the rotating shaft 23 through any structure that can transmit torque, such as a first spline 243b. The first cam 241 is connected to the rotating shaft 23 through the first support shaft 243, so that the first damping structure 24 can be independent of the fastened base 22 and the rotating shaft 23. Therefore, a module that can be produced separately is formed, thereby facilitating use of the first damping structure 24. The second cam 242 is slidably connected to the first support shaft 243. For example, non-circular structures that fit with each other are provided between the second cam 242 and the first support shaft 243, so that the second cam 242 is rotatable along with the first support shaft 243. The first cam 241 is sleeved on the first support shaft 243, so that the first cam 241 is rotatable relative to the first support shaft 243, thereby the first cam 241 and the second cam 242 are rotatable relative to each other. A first limit shoulder 243a may be provided on a side of the first cam 241 that is away from the second cam 242, to define a position of the first cam 241. Therefore, a pressing force is formed between the first cam 241 and the second cam 242.

Further, the first damping structure 24 further includes a first elastic member 244. The first elastic member 244 includes a plurality of sequentially stacked disc springs. The first elastic member 244 is disposed on a side of the second cam 242 that is away from the first cam 241. Two ends of the first elastic member 244 elastically abut against the first support shaft 243 and the second cam 242 respectively, to force the second cam 242 to be pressed against the first cam 241. It may be understood that the first elastic member 244 may alternatively use another structural member that can provide a pressing force, such as a spring, or the like.

Further, the first damping structure 24 further includes a first adjusting nut 245. Two ends of the first elastic member 244 elastically abut against the first adjusting nut 245 and the second cam 242, respectively. A pre-tightening force of the first elastic member 244 is adjusted through the first adjusting nut 245, thereby a damping value of the first damping structure 24 is adjusted.

Further, the first damping structure 24 further includes a first buffer washer 246. The first buffer washer 246 is disposed between the first adjusting nut 245 and the first elastic member 244. The first buffer washer 246 is used to provide buffering and relaxing effects, to ensure that a planar contact is formed between the first adjusting nut 245 and the first elastic member.

As shown in FIG. 8, FIG. 11, FIG. 17, and FIG. 18, the second damping structure 25 according to this embodiment of this application includes a one-way bearing 251 and a friction plate 252. An outer ring of the one-way bearing 251 is fixedly connected to the fastened base 22, and the friction plate 252 is connected to the rotating shaft 23, so that a damping is formed between the friction plate 252 and an inner ring of the one-way bearing 251.

When the rotating shaft 23 rotates in a direction away from the base 1, the inner ring of the one-way bearing 251 may rotate freely. The rotating shaft 23 drives, through the friction plate 252, the inner ring of the one-way bearing 251 to rotate, thereby opening the keyboard apparatus 01. When the rotating shaft 23 rotates in a direction toward the base 1, the inner ring and the outer ring of the one-way bearing 251 are fastened and cannot rotate. The rotating shaft 23 drives the friction plate 252 to rotate. A relative rotation is generated between the friction plate 252 and the inner ring of the one-way bearing 251, to form a damping. That is, the second damping structure 25 according to this embodiment can enable the keyboard apparatus to achieve a characteristic of "easy-opening and hard-closing", to avoid accidents caused by excessively fast closing, and to improve service performance of the terminal device. When the user opens the keyboard apparatus 01, the second damping structure 25 does not generate any damping, thereby allowing the user to open the keyboard apparatus 01 with less force, so that the operation is more labor-saving and smooth. When the user closes the keyboard apparatus 01, the second damping structure 25 generates a damping, to avoid an excessively high sliding speed of the keyboard apparatus 01 during closing to cause pinching of the user, or to cause damage due to collision between the tablet device 02 and the base 1.

Further, the second damping structure 25 further includes a second support shaft 253, where the second support shaft 253 is fixedly connected to one end of the rotating shaft 23. For example, the second support shaft 253 is connected to the rotating shaft 23 through any structure that can transmit torque, such as a second spline 253b. The friction plate 252 is connected to the rotating shaft 23 through the second support shaft 253, so that the second damping structure 25 can be independent of the fastened base 22 and the rotating shaft 23. Therefore, a module that can be produced separately is formed, thereby facilitating use of the second damping structure 25. The friction plate 252 is slidably connected to the second support shaft 253. For example, non-circular structures that fit with each other are provided between the friction plate 252 and the second support shaft 253, so that the friction plate 252 is rotatable along with the second support shaft 253. The one-way bearing 251 is sleeved on the second support shaft 253, so that the inner ring of the one-way bearing 251 is rotatable relative to the second support shaft 253. That is, the second support shaft 253 does not directly drive the inner ring of the one-way bearing 251 to rotate, but drives, through the friction plate 252, the inner ring of the one-way bearing 251 to rotate. A second limit shoulder 253a may be provided on a side of the one-way bearing 251 that is away from the friction plate 252, to define a position of the one-way bearing 251. Therefore, a pressing force is formed between the inner ring of the one-way bearing 251 and the friction plate 252.

Further, the second damping structure 25 further includes a second elastic member 254. The second elastic member 254 includes a plurality of sequentially stacked disc springs. The second elastic member 254 is disposed on a side of the friction plate 252 that is away from the one-way bearing 251. Two ends of the second elastic member 254 elastically abut against the second support shaft 253 and the friction plate 252. It may be understood that the second elastic member 254 may alternatively use another structural member that can provide a pressing force, such as a spring, or the like.

Further, the second damping structure 25 further includes a connecting piece 255. A first end of the connecting piece 255 is fixedly connected to the inner ring of the one-way bearing 251. The friction plate 252 is pressed against a second end of the connecting piece 255. That is, the connecting piece 255 provides a function of connecting the one-way bearing 251 and the friction plate 252, generating a damping between the friction plate 252 and the second end of the connecting piece 255. A cross-section of the first end of the connecting piece 255 is small, to facilitate the connection of the one-way bearing 251. A cross-section of the second end of the connecting piece 255 is large, to facilitate a large contact area with the friction plate 252, thereby forming a smooth and reliable connection.

Further, the second damping structure 25 further includes a friction washer 256, where the friction washer 256 is slidably connected to a second end of the connecting piece 255. The friction washer 256 is fastened relative to the connecting piece 255 (that is, they cannot rotate relative to each other) in a circumferential direction. The friction plate 252 is pressed against the friction washer 256. That is, a damping is generated between the friction plate 252 and the friction washer 256 by using the principle of friction.

Further, the second damping structure 25 further includes a second adjusting nut 257. Two ends of the second elastic member 254 elastically abut against the second adjusting nut 257 and the friction plate 252, respectively. A pre-tightening force of the second elastic member 254 is adjusted through the second adjusting nut 257, thereby a damping value of the second damping structure 25 is adjusted.

Further, the second damping structure 25 further includes a second buffer washer 258. The second buffer washer 258 is disposed between the second adjusting nut 257 and the second elastic member 254. The second buffer washer 258 is used to provide buffering and relaxing effects, to ensure that a planar contact is formed between the second adjusting nut 257 and the second elastic member 254.

Figure 19:
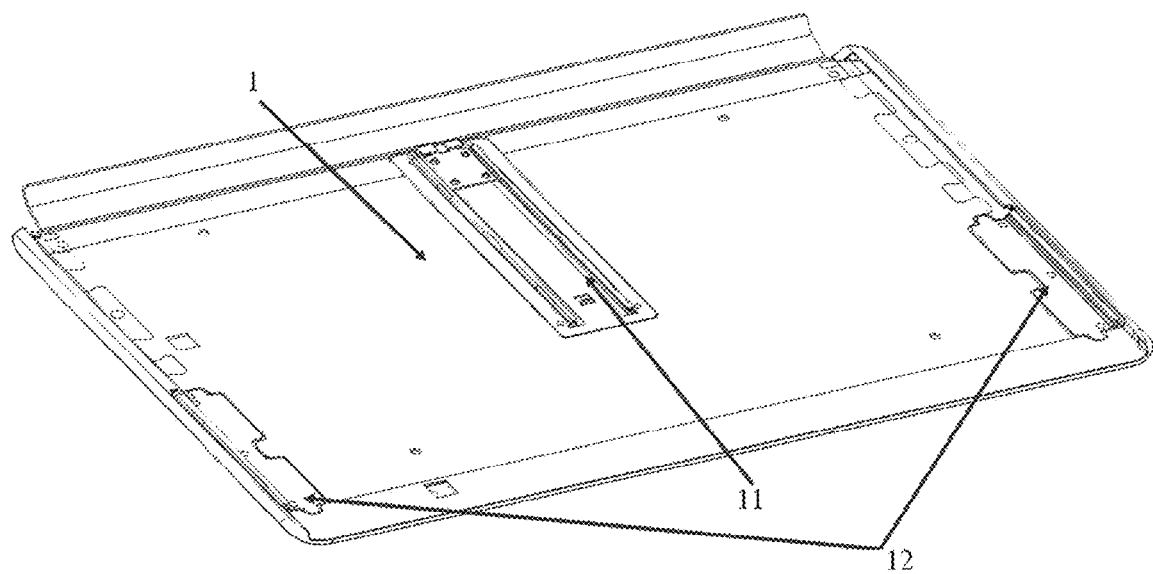
FIG. 19 is a schematic structural diagram of a base according to an embodiment of this application.

As shown in FIG. 19, a first guide rail 11 and a second guide rail 12 are provided on the base 1. The first guide rail 11 is disposed in the center of the base 1. The second guide rail 12 is symmetrically distributed on two sides of the first guide rail 11. A center of the keyboard module 2 is slidably connected to the first guide rail 11, and two sides of the keyboard module 2 are slidably connected to the second guide rail 12 respectively, to enable a stable and smooth sliding between the keyboard module 2 and the base 1. In addition, the first guide rail 11 serves as a support to a central position of the keyboard module 2, to prevent the keyboard module 2 from bending due to sinking of the center of the keyboard module 2. The second guide rail 12 provides a function of connecting the two sides of the keyboard module 2, to prevent the two sides of the keyboard module 2 from being deformed upward to bend the keyboard module 2.

Further, the first guide rail 11 is disposed at one end of the base 1 that is close to the first plate 3 (that is, a front end of the base 1), and extends to a middle portion of the base 1 in a direction away from the first plate 3. The second guide rail 12 is disposed at one end of the base 1 that is away from the first plate 3 (that is, a rear end of the base 1), and extends to the middle portion of the base 1 in a direction toward the first plate 3. The first guide rail 11 and the second guide rail 12 form a triangular distribution structure, thereby forming a stable planar support structure for the keyboard module 2. In addition, as the second guide rail 12 is close to the rear end of the base 1, the second guide rail 12 can be prevented from being exposed in a sliding process of the keyboard module 2 to cause scratching or pinching of a user by the second guide rail 12. In addition, the second guide rail 12 is close to the rear end of the base 1, so that a position at which the second guide rail 12 acts on the keyboard module 2 can be as close as possible to a rear end of the keyboard module 2. When the keyboard apparatus 01 is closed, the keyboard module 2 slides into the base 1. A point at which the second guide rail 12 is connected to the keyboard module 2 is close to the rear end of the keyboard module 2. This can effectively prevent the rear end of the keyboard module 2 from being deformed upward to bend the keyboard module 2. When the keyboard apparatus 01 is opened, the keyboard module 2 slides out of the base 1. A support point of the second guide rail 12 for the keyboard module 2 is close to the rear end of the keyboard module 2. This can reduce a moment generated on the second guide rail 12 after the keyboard module 2 slides out, and can prevent a bottom of the keyboard module 2 from being deformed upward.

Figure 20:
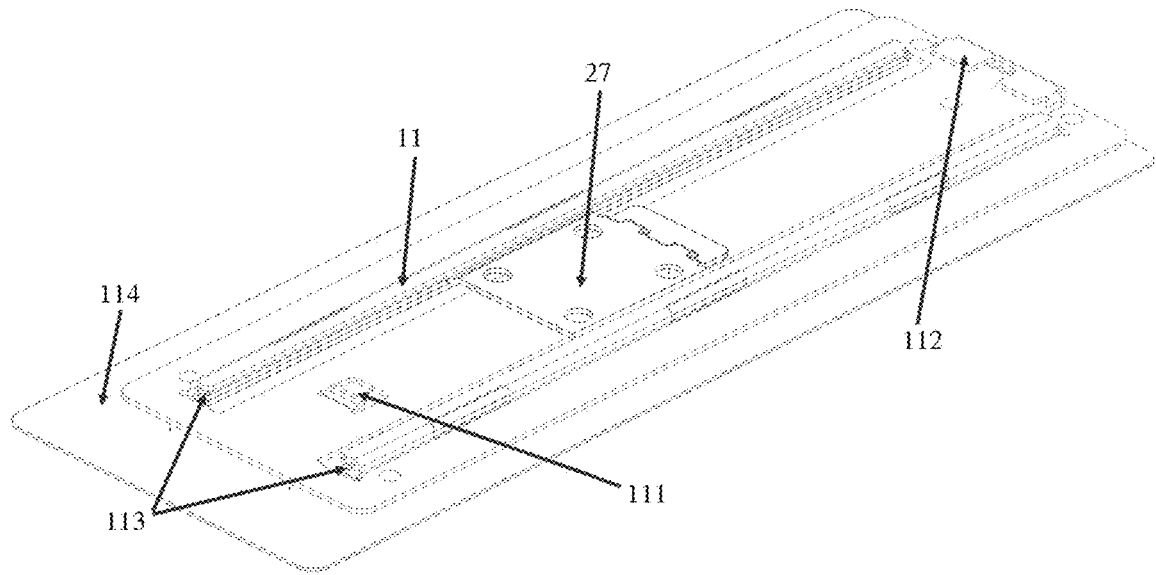
FIG. 20 is a schematic structural diagram of a first rail according to an embodiment of this application.

As shown in FIG. 20, the first guide rail 11 according to this embodiment of this application includes a connecting seat 114 and two first sliding slots 113. Both of the two first sliding slots 113 are provided on the connecting seat 114. The two first sliding slots 113 are provided oppositely and extend along the front-rear direction of the base 1. A first slider 27 in fit with the first guide rail 11 is provided in the center of the keyboard module 2. Two first sliding slots 113 are inserted into two sides of the first slider 27 respectively, and the first slider 27 can slide along the first sliding slots 113. A POM adhesive may be provided between the first slider 27 and the first sliding slots 113, to provide a self-lubricating function and ensure long-term reliability of slide rail movement.

Further, a first stop portion 111 is provided on the first guide rail 11. The first stop portion 111 is disposed between the two first sliding slots 113, that is, the first stop portion 111 is disposed on the connecting seat 114. When the first slider 27 slides along the first sliding slots 113, the first slider 27 can stop at the first stop portion 111, to limit a sliding stroke of the keyboard module 2, thereby limiting a maximum angle at which the tablet device 02 is flipped.

Further, a second stop portion 112 is provided at one end of the first guide rail 11 that is close to the first plate 3. The second stop portion 112 is disposed between the two first sliding slots 113, that is, the second stop portion 112 is disposed on the connecting seat 114. When the first slider 27 slides along the first sliding slots 113, the first slider 27 can stop at the second stop portion 112, to prevent the keyboard module 2 from sliding out of the base 1 in a reverse direction. The second stop portion 112 provides a foolproof function, to prevent the user from opening the keyboard apparatus 01 when the front and back sides of the keyboard apparatus 01 are reversed, and prevents the keyboard apparatus 01 from damaged. That is, when the user opens the keyboard apparatus 01 with the front and back sides of the keyboard apparatus 01 reversed (that is, the first plate 3 and a second plate 4 face down and the base 1 face up), the user flips the base 1. As the first plate 3 and the second plate 4 cannot rotate relative to each other, the keyboard module 2 tends to slide forward. The arrangement of the second stop portion 112 can prevent the keyboard module 2 from sliding forward, thereby preventing the keyboard module 2 from sliding out of the base 1 in a reverse direction, and ensuring safe usage.

Figure 21:
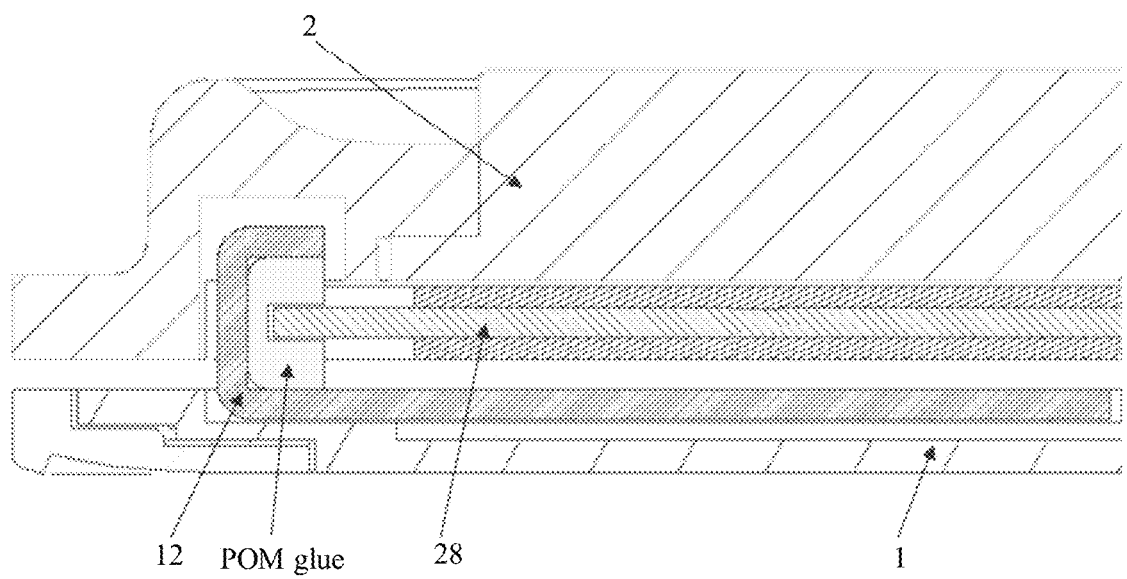
FIG. 21 is a schematic cross-sectional structural diagram of a second rail according to an embodiment of this application.

As shown in FIG. 21, the second guide rail 12 includes a second sliding slot 121. The second sliding slot 121 extends along the front-rear direction of the base 1. An opening of the second sliding slot 121 is oriented toward the center of the base 1. Two second guide rails 12 are left-right symmetrically distributed with respect to the center of the base 1. A second slider 28 is disposed on each of two sides of the keyboard module 2. One side of the second slider 28 is fixedly connected to the keyboard module 2. The other side of the second slider is inserted into the second sliding slot 121, and can slide along the second sliding slot 121. A POM adhesive may be provided between the second slider 28 and the second sliding slots 121, to provide a self-lubricating function and ensure long-term reliability of the movement of slide rail movement.

In some embodiments, the first guide rail 11 and the second guide rail 12 can be formed into proper shapes by a stamping process, and the process is simple. The first guide rail 11 and the second guide rail 12 are fixedly connected to an iron piece embedded in the base 1 by laser welding or adhesion and are fastened to the iron piece. A first slider 27 and the second slider 28 are fixedly connected to an iron piece embedded in the keyboard module 2 by fasteners such as screws.

Figure 22:
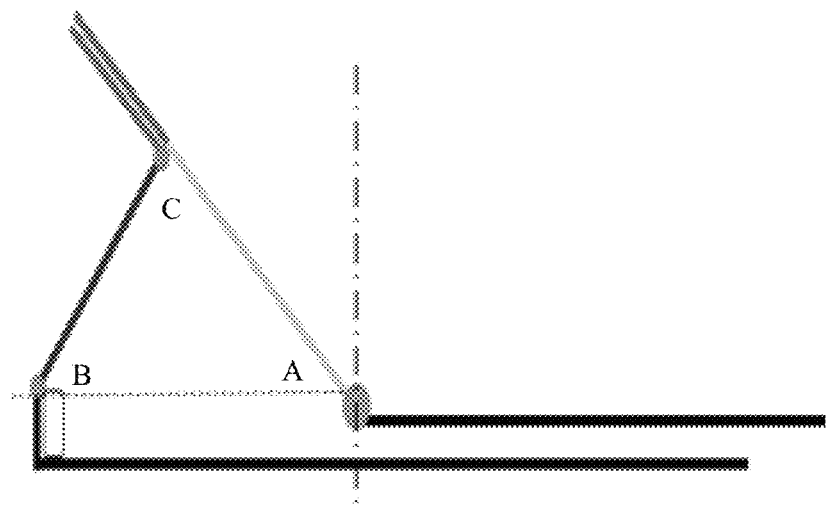
FIG. 22 is a schematic diagram of a mechanical model of a terminal in a use state according to an embodiment of this application.
Figure 23:
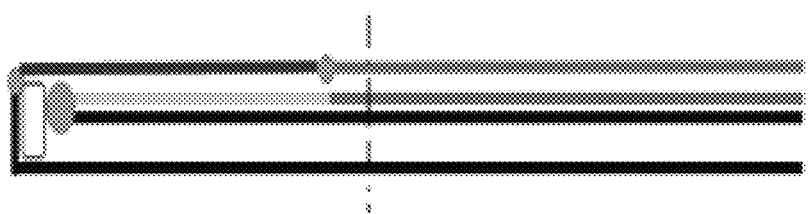
FIG. 23 is a schematic diagram of a mechanical model of a terminal in a closed state according to an embodiment of this application.
Figure 24:
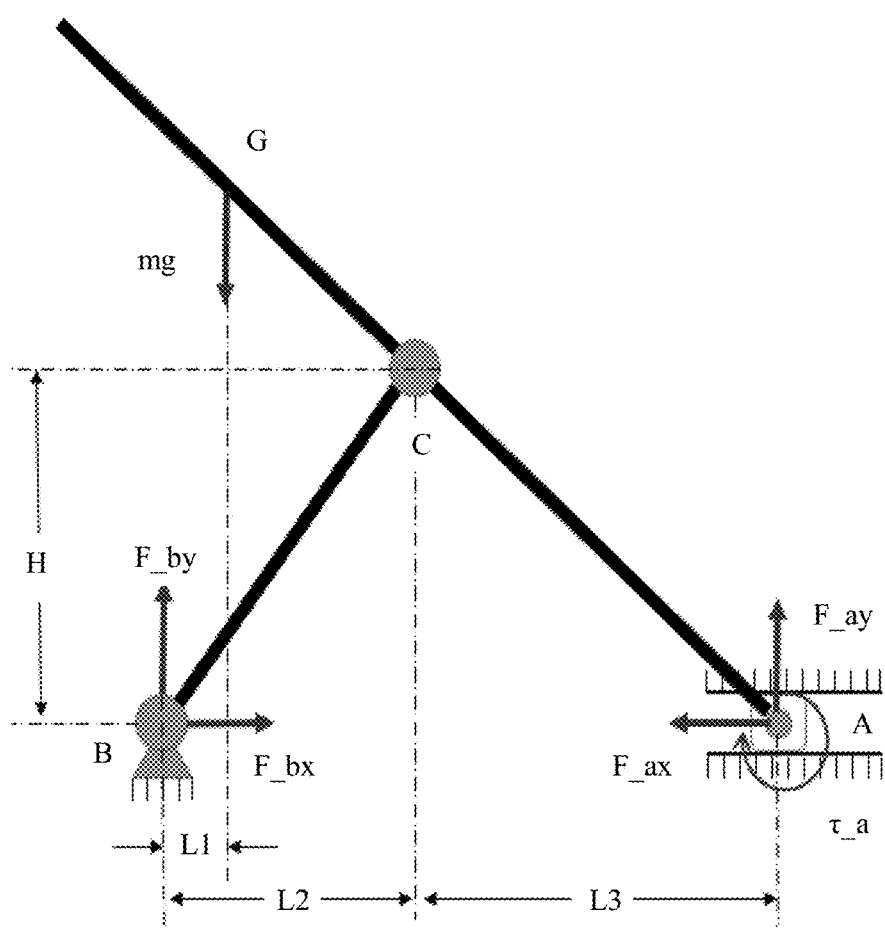
FIG. 24 is a schematic diagram of a mechanic analysis of a terminal according to an embodiment of this application.

As shown in FIG. 22 to FIG. 24, to further describe the fact that the stable triangular support structure can be formed at any angle within the rotation stroke of the terminal according to this embodiment of this application, a mechanical model is established for the terminal according to this embodiment of this application, and mechanic analysis is performed. FIG. 22 is a schematic diagram of a mechanical model of the terminal in a use state according to this embodiment of this application. FIG. 23 is a schematic diagram of a mechanical model of the terminal in a closed state according to this embodiment of this application. FIG. 24 is a mechanic analysis diagram of the terminal in a use state according to this embodiment of this application. According to FIG. 24, the calculation model is established as follows:

$$\Sigma_x F = 0 \rightarrow F_b \cos(\beta) - F_{ax} = 0$$

$$\Sigma_y F = 0 \rightarrow F_b \sin(\beta) + F_{ay} - mg = 0$$

$$\Sigma_A M = 0 \rightarrow mg * AG * \cos(\alpha) - F_b \times AC * \sin(C) - \tau_a = 0$$

Main parameters involved in the models are shown in Table 1, Table 2 and Table 3. Based on the parameters in Table 1, Table 2 and Table 3, and a traversal mechanic analysis is performed for every 0.5° within a range of 90° to 130°, as shown in Table 4. It can be learned from the data in Table 4 that a stepless suspension can be implemented in a range of 90° to 130° for a terminal according to this embodiment of this application.

TABLE 1

| Geometric information | |
|---|---|
| BC length (mm) | 61.62 |
| AC length (mm) | 57.86 |
| AB length (mm) | 80 |

TABLE 2

| Host information | |
|---|---|
| Weight (g) | 600 |
| Center-of-gravity position: Distance from the bottom of host (mm) | 90 |

TABLE 3

| Damping information | |
|---|---|
| Damping of A-point (kgf*cm) | 1 |
| Damping of sliding rail (kgf) | 2 |
| Safety coefficient | 1.5 |

TABLE 4

| Opening angle of host ° | Angle A ° | Angle B ° | Angle C ° | AB length m | L1 m | L2 m | L3 m | H m | Stable moment Nm |
|---|---|---|---|---|---|---|---|---|---|
| 90 | 90 | 69.9 | 20.1 | 0.021 | 0.021 | 0.021 | 0.000 | 0.058 | 1.23 |
| 90.5 | 89.5 | 69.9 | 20.6 | 0.022 | 0.021 | 0.021 | 0.001 | 0.058 | 1.25 |
| 91 | 89 | 69.9 | 21.1 | 0.022 | 0.021 | 0.021 | 0.001 | 0.058 | 1.27 |
| 91.5 | 88.5 | 69.8 | 21.7 | 0.023 | 0.020 | 0.021 | 0.002 | 0.058 | 1.29 |
| 92 | 88 | 69.8 | 22.2 | 0.023 | 0.020 | 0.021 | 0.002 | 0.058 | 1.31 |
| 92.5 | 87.5 | 69.7 | 22.8 | 0.024 | 0.020 | 0.021 | 0.003 | 0.058 | 1.33 |
| 93 | 87 | 69.7 | 23.3 | 0.024 | 0.019 | 0.021 | 0.003 | 0.058 | 1.35 |
| 93.5 | 86.5 | 69.6 | 23.9 | 0.025 | 0.019 | 0.021 | 0.004 | 0.058 | 1.37 |
| 94 | 86 | 69.5 | 24.5 | 0.026 | 0.019 | 0.022 | 0.004 | 0.058 | 1.38 |
| 94.5 | 85.5 | 69.4 | 25.1 | 0.026 | 0.019 | 0.022 | 0.005 | 0.058 | 1.40 |
| 95 | 85 | 69.3 | 25.7 | 0.027 | 0.018 | 0.022 | 0.005 | 0.058 | 1.42 |
| 95.5 | 84.5 | 69.2 | 26.3 | 0.027 | 0.018 | 0.022 | 0.006 | 0.058 | 1.43 |
| 96 | 84 | 69.0 | 27.0 | 0.028 | 0.018 | 0.022 | 0.006 | 0.058 | 1.45 |
| 96.5 | 83.5 | 68.9 | 27.6 | 0.029 | 0.018 | 0.022 | 0.007 | 0.057 | 1.46 |
| 97 | 83 | 68.7 | 28.3 | 0.029 | 0.018 | 0.022 | 0.007 | 0.057 | 1.48 |
| 97.5 | 82.5 | 68.6 | 28.9 | 0.030 | 0.018 | 0.023 | 0.008 | 0.057 | 1.49 |
| 98 | 82 | 68.4 | 29.6 | 0.031 | 0.017 | 0.023 | 0.008 | 0.057 | 1.50 |
| 98.5 | 81.5 | 68.2 | 30.3 | 0.031 | 0.017 | 0.023 | 0.009 | 0.057 | 1.52 |
| 99 | 81 | 68.0 | 31.0 | 0.032 | 0.017 | 0.023 | 0.009 | 0.057 | 1.53 |
| 99.5 | 80.5 | 67.8 | 31.7 | 0.033 | 0.017 | 0.023 | 0.010 | 0.057 | 1.54 |
| 100 | 80 | 67.6 | 32.4 | 0.034 | 0.017 | 0.023 | 0.010 | 0.057 | 1.55 |
| 100.5 | 79.5 | 67.4 | 33.3 | 0.034 | 0.017 | 0.024 | 0.011 | 0.057 | 1.56 |
| 101 | 79 | 67.2 | 33.8 | 0.035 | 0.017 | 0.024 | 0.011 | 0.057 | 1.57 |
| 101.5 | 78.5 | 66.9 | 34.6 | 0.036 | 0.017 | 0.024 | 0.012 | 0.057 | 1.57 |
| 102 | 78 | 66.7 | 35.3 | 0.036 | 0.016 | 0.024 | 0.012 | 0.057 | 1.58 |
| 102.5 | 77.5 | 66.5 | 36.0 | 0.037 | 0.016 | 0.025 | 0.013 | 0.056 | 1.59 |
| 103 | 77 | 66.2 | 36.8 | 0.038 | 0.016 | 0.025 | 0.013 | 0.056 | 1.59 |
| 103.5 | 76.5 | 65.9 | 37.6 | 0.039 | 0.016 | 0.025 | 0.014 | 0.056 | 1.60 |
| 104 | 76 | 65.7 | 38.3 | 0.039 | 0.016 | 0.025 | 0.014 | 0.056 | 1.60 |
| 104.5 | 75.5 | 65.4 | 39.1 | 0.040 | 0.016 | 0.026 | 0.014 | 0.056 | 1.61 |
| 105 | 75 | 65.1 | 39.9 | 0.041 | 0.016 | 0.026 | 0.015 | 0.056 | 1.61 |
| 105.5 | 74.5 | 64.8 | 40.7 | 0.042 | 0.016 | 0.026 | 0.015 | 0.056 | 1.61 |
| 106 | 74 | 64.5 | 41.5 | 0.042 | 0.016 | 0.027 | 0.016 | 0.056 | 1.61 |
| 106.5 | 73.5 | 64.2 | 42.3 | 0.043 | 0.016 | 0.027 | 0.016 | 0.055 | 1.61 |
| 107 | 73 | 63.9 | 43.1 | 0.044 | 0.016 | 0.027 | 0.017 | 0.055 | 1.61 |
| 107.5 | 72.5 | 63.6 | 43.9 | 0.045 | 0.016 | 0.027 | 0.017 | 0.055 | 1.61 |
| 108 | 72 | 63.3 | 44.7 | 0.046 | 0.016 | 0.028 | 0.018 | 0.055 | 1.61 |
| 108.5 | 71.5 | 62.9 | 45.6 | 0.046 | 0.016 | 0.028 | 0.018 | 0.055 | 1.61 |
| 109 | 71 | 62.6 | 46.4 | 0.047 | 0.016 | 0.028 | 0.019 | 0.055 | 1.61 |
| 109.5 | 70.5 | 62.3 | 47.2 | 0.048 | 0.016 | 0.029 | 0.019 | 0.055 | 1.61 |
| 110 | 70 | 61.9 | 48.1 | 0.049 | 0.016 | 0.029 | 0.020 | 0.054 | 1.60 |
| 110.5 | 69.5 | 61.6 | 48.9 | 0.050 | 0.016 | 0.029 | 0.020 | 0.054 | 1.60 |
| 111 | 69 | 61.2 | 49.8 | 0.050 | 0.016 | 0.030 | 0.021 | 0.054 | 1.60 |
| 111.5 | 68.5 | 60.9 | 50.6 | 0.051 | 0.016 | 0.030 | 0.021 | 0.054 | 1.59 |
| 112 | 68 | 60.5 | 51.5 | 0.052 | 0.016 | 0.030 | 0.022 | 0.054 | 1.59 |
| 112.5 | 67.5 | 60.2 | 52.3 | 0.053 | 0.016 | 0.031 | 0.022 | 0.053 | 1.58 |
| 113 | 67 | 59.8 | 53.2 | 0.054 | 0.016 | 0.031 | 0.023 | 0.053 | 1.57 |
| 113.5 | 66.5 | 59.4 | 54.1 | 0.054 | 0.016 | 0.031 | 0.023 | 0.053 | 1.57 |
| 114 | 66 | 59.1 | 54.9 | 0.055 | 0.016 | 0.032 | 0.024 | 0.053 | 1.56 |
| 114.5 | 65.5 | 58.7 | 55.8 | 0.056 | 0.016 | 0.032 | 0.024 | 0.053 | 1.55 |
| 115 | 65 | 58.3 | 56.7 | 0.057 | 0.016 | 0.032 | 0.024 | 0.052 | 1.55 |
| 115.5 | 64.5 | 57.9 | 57.6 | 0.058 | 0.016 | 0.033 | 0.025 | 0.052 | 1.54 |
| 116 | 64 | 57.6 | 58.4 | 0.058 | 0.016 | 0.033 | 0.025 | 0.052 | 1.53 |
| 116.5 | 63.5 | 57.2 | 59.3 | 0.059 | 0.016 | 0.033 | 0.026 | 0.052 | 1.52 |

TABLE 4-continued

| Opening angle of host ° | Angle A ° | Angle B ° | Angle C ° | AB length m | L1 m | L2 m | L3 m | H m | Stable moment Nm |
|---|---|---|---|---|---|---|---|---|---|
| 117 | 63 | 56.8 | 60.2 | 0.060 | 0.016 | 0.034 | 0.026 | 0.052 | 1.51 |
| 117.5 | 62.5 | 56.4 | 61.1 | 0.061 | 0.016 | 0.034 | 0.027 | 0.051 | 1.50 |
| 118 | 62 | 56.0 | 62.0 | 0.062 | 0.017 | 0.034 | 0.027 | 0.051 | 1.49 |
| 118.5 | 61.5 | 55.6 | 62.9 | 0.062 | 0.017 | 0.035 | 0.028 | 0.051 | 1.48 |
| 119 | 61 | 55.2 | 63.8 | 0.063 | 0.017 | 0.035 | 0.028 | 0.051 | 1.47 |
| 119.5 | 60.5 | 54.8 | 64.7 | 0.064 | 0.017 | 0.036 | 0.028 | 0.050 | 1.46 |
| 120 | 60 | 54.4 | 65.6 | 0.065 | 0.017 | 0.036 | 0.029 | 0.050 | 1.45 |
| 120.5 | 59.5 | 54.0 | 66.5 | 0.066 | 0.017 | 0.036 | 0.029 | 0.050 | 1.44 |
| 121 | 59 | 53.6 | 67.4 | 0.066 | 0.017 | 0.037 | 0.030 | 0.050 | 1.43 |
| 121.5 | 58.5 | 53.2 | 68.3 | 0.067 | 0.017 | 0.037 | 0.030 | 0.049 | 1.42 |
| 122 | 58 | 52.8 | 69.2 | 0.068 | 0.017 | 0.037 | 0.031 | 0.049 | 1.40 |
| 122.5 | 57.5 | 52.4 | 70.1 | 0.069 | 0.017 | 0.038 | 0.031 | 0.049 | 1.39 |
| 123 | 57 | 52.0 | 71.0 | 0.069 | 0.017 | 0.038 | 0.032 | 0.049 | 1.38 |
| 123.5 | 56.5 | 51.5 | 72.0 | 0.070 | 0.017 | 0.038 | 0.032 | 0.048 | 1.37 |
| 124 | 56 | 51.1 | 72.9 | 0.071 | 0.017 | 0.039 | 0.032 | 0.048 | 1.35 |
| 124.5 | 55.5 | 50.7 | 73.8 | 0.072 | 0.017 | 0.039 | 0.033 | 0.048 | 1.34 |
| 125 | 55 | 50.3 | 74.7 | 0.073 | 0.018 | 0.039 | 0.033 | 0.047 | 1.33 |
| 125.5 | 54.5 | 49.9 | 75.6 | 0.073 | 0.018 | 0.040 | 0.034 | 0.047 | 1.31 |
| 126 | 54 | 49.4 | 76.6 | 0.074 | 0.018 | 0.040 | 0.034 | 0.047 | 1.30 |
| 126.5 | 53.5 | 49.0 | 77.5 | 0.075 | 0.018 | 0.040 | 0.034 | 0.047 | 1.28 |
| 127 | 53 | 48.6 | 78.4 | 0.076 | 0.018 | 0.041 | 0.035 | 0.046 | 1.27 |
| 127.5 | 52.5 | 48.2 | 79.3 | 0.076 | 0.018 | 0.041 | 0.035 | 0.046 | 1.25 |
| 128 | 52 | 47.7 | 80.3 | 0.077 | 0.018 | 0.041 | 0.036 | 0.046 | 1.24 |
| 128.5 | 51.5 | 47.3 | 81.2 | 0.078 | 0.018 | 0.042 | 0.036 | 0.045 | 1.22 |
| 129 | 51 | 46.9 | 82.1 | 0.079 | 0.018 | 0.042 | 0.036 | 0.045 | 1.21 |
| 129.5 | 50.5 | 46.4 | 83.1 | 0.079 | 0.018 | 0.042 | 0.037 | 0.045 | 1.19 |
| 130 | 50 | 46.0 | 84.0 | 0.080 | 0.018 | 0.043 | 0.037 | 0.044 | 1.18 |

It should be noted that a part of this patent application document includes content protected by copyright. Except for making copies of patent documents of the Patent Office or the content of patent documents recorded by the Patent Office, the copyright owner retains copyright.

What is claimed is:

1. A keyboard apparatus, comprising:
   a base;
   a keyboard module, stacked on the base and in sliding fit with the base;
   a first plate, rotatably connected to one end of the base, wherein a first rotating part is formed between the first plate and the base;
   a second plate, rotatably connected to one end of the first plate that is away from the base, wherein a second rotating part is formed between the second plate and the first plate; and
   a third plate, rotatably connected to one end of the keyboard module that is close to the first plate, and fastened to the second plate, to drive the second plate to rotate, wherein the third plate is configured to carry a tablet device, and a third rotating part is formed between the third plate and the keyboard module, wherein the third rotating part comprises a rotating shaft fixedly connected to the third plate, and wherein at least one of the rotating parts of the keyboard apparatus is provided with a damping structure; and
   the third plate is flipped, so that the third plate is inclined relative to the base, the third plate drives the keyboard module to slide along the base, and the third plate drives, through the second plate, the first plate to rotate, so that the base, the first plate, and the third plate form a triangular support structure.

2. The keyboard apparatus according to claim 1, wherein the keyboard module comprises a fastened base and the rotating shaft that are in rotatable fit with each other, the fastened base is disposed at the end of the keyboard module that is close to the first plate, and the damping structure is provided between the fastened base and the rotating shaft.

3. The keyboard apparatus according to claim 2, wherein a movable portion is provided in a middle portion of the rotating shaft, the movable portion is rotatable about the rotating shaft, and the third plate is fixedly connected to the movable portion.

4. The keyboard apparatus according to claim 1, wherein the base comprises a fastened base and the rotating shaft that are in rotatable fit with each other, the fastened base is disposed at one end of the base, the rotating shaft is fastened relative to the first plate, and the damping structure is provided between the fastened base and the rotating shaft.

5. The keyboard apparatus according to claim 2, wherein the damping structure comprises a first damping structure, the first damping structure comprises a first cam and a second cam that are pressed against each other, the first cam is fixedly connected to the fastened base, and the second cam is fixedly connected to the rotating shaft.

6. The keyboard apparatus according to claim 5, wherein the first damping structure further comprises a first support shaft, and the first support shaft is connected to one end of the rotating shaft; and
   the second cam is slidably connected to the first support shaft, and the first cam is sleeved on the first support shaft.

7. The keyboard apparatus according to claim 6, wherein the first damping structure further comprises a first elastic member, and two ends of the first elastic member elastically abut against the first support shaft and the second cam respectively, to force the second cam to be pressed against the first cam.

8. The keyboard apparatus according to claim 7, wherein the first damping structure further comprises a first adjusting nut, and the two ends of the first elastic member elastically abut against the first adjusting nut and the second cam, respectively.

9. The keyboard apparatus according to claim 8, wherein the first damping structure further comprises a first buffer washer, and the first buffer washer is disposed between the first adjusting nut and the first elastic member.

10. The keyboard apparatus according to claim 2, wherein the damping structure comprises a second damping structure, and the second damping structure comprises a one-way bearing and a friction plate; and
- an outer ring of the one-way bearing is fixedly connected to the fastened base, the friction plate is fixedly connected to the rotating shaft, and the friction plate is pressed against an inner ring of the one-way bearing.

11. The keyboard apparatus according to claim 10, wherein the second damping structure further comprises a second support shaft, the second support shaft is connected to one end of the rotating shaft; and
- the friction plate is slidably connected to the second support shaft, and the one-way bearing is sleeved on the second support shaft.

12. The keyboard apparatus according to claim 11, wherein the second damping structure further comprises a second elastic member, and two ends of the second elastic member elastically abut against the second support shaft and the friction plate, respectively.

13. The keyboard apparatus according to claim 12, wherein the second damping structure further comprises a connecting piece, a first end of the connecting piece is fixedly connected to the inner ring of the one-way bearing, and the friction plate is pressed against a second end of the connecting piece.

14. The keyboard apparatus according to claim 13, wherein the second damping structure further comprises a friction washer, the friction washer is slidably connected to the second end of the connecting piece, and the friction plate is pressed against the friction washer.

15. The keyboard apparatus according to claim 12, wherein the second damping structure further comprises a second adjusting nut, and the two ends of the second elastic member elastically abut against the second adjusting nut and the friction plate, respectively.

16. The keyboard apparatus according to claim 15, wherein the second damping structure further comprises a second buffer washer, and the second buffer washer is disposed between the second adjusting nut and the second elastic member.

17. The keyboard apparatus according to claim 1, wherein a first guide rail and a second guide rail are provided on the base, the first guide rail is disposed in a center of the base, and the second guide rail is symmetrically distributed on two sides of the first guide rail; and
- a center of the keyboard module is slidably connected to the first guide rail, and two sides of the keyboard module are slidably connected to the second guide rail, respectively.

18. The keyboard apparatus according to claim 17, wherein the first guide rail is disposed at one end of the base that is close to the first plate, and extends to a middle portion of the base in a direction away from the first plate; and;
- the second guide rail is disposed at one end of the base that is away from the first plate, and extends to the middle portion of the base in a direction toward the first plate.

19. A terminal, comprising a tablet device and a keyboard apparatus, wherein the keyboard apparatus comprises:
- a base;
- a keyboard module, stacked on the base and in sliding fit with the base;
- a first plate, rotatably connected to one end of the base, wherein a first rotating part is formed between the first plate and the base;
- a second plate, rotatably connected to one end of the first plate that is away from the base, wherein a second rotating part is formed between the second plate and the first plate; and
- a third plate, rotatably connected to one end of the keyboard module that is close to the first plate, and fastened to the second plate, to drive the second plate to rotate, wherein the third plate is configured to carry the tablet device, and a third rotating part is formed between the third plate and the keyboard module, wherein the third rotating part comprises a rotating shaft fixedly connected to the third plate, and wherein
- at least one of the rotating parts of the keyboard apparatus is provided with a damping structure; and
- the third plate is flipped, so that the third plate is inclined relative to the base, the third plate drives the keyboard module to slide along the base, and the third plate drives, through the second plate, the first plate to rotate, so that the base, the first plate, and the third plate form a triangular support structure.

20. The terminal according to claim 19, wherein the keyboard module comprises a fastened base and the rotating shaft that are in rotatable fit with each other, the fastened base is disposed at the end of the keyboard module that is close to the first plate, and the damping structure is provided between the fastened base and the rotating shaft.

* * * * *